(12) United States Patent
Okada et al.

(10) Patent No.: US 6,445,877 B1
(45) Date of Patent: Sep. 3, 2002

(54) INFORMATION RECORDING MEDIUM, APPARATUS AND METHOD FOR RECORDING OR REPRODUCING DATA THEREOF

(75) Inventors: Tomoyuki Okada, Osaka; Kaoru Murase, Nara; Kazuhiro Tsuga, Hyogo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/443,498

(22) Filed: Nov. 19, 1999

(30) Foreign Application Priority Data

Nov. 19, 1998 (JP) .............................. 10-329032

(51) Int. Cl.[7] .................................................. H04N 5/91
(52) U.S. Cl. .............................. 386/95; 386/68; 386/70; 386/125
(58) Field of Search ..................... 386/68, 70, 125–126, 386/109, 111, 69, 82, 110, 112, 95; H04N 5/91

(56) References Cited

U.S. PATENT DOCUMENTS

| | | | |
|---|---|---|---|
| 5,535,008 A | * | 7/1996 | Yamagishi et al. ......... 386/109 |
| 5,568,461 A | | 10/1996 | Nishiuchi et al. |
| 5,596,564 A | * | 1/1997 | Fukushima et al. ........... 386/70 |
| 5,694,172 A | | 12/1997 | Miyano |
| 5,740,306 A | | 4/1998 | Shinohara et al. |
| 5,748,240 A | | 5/1998 | Carr et al. |
| 5,838,873 A | | 11/1998 | Blatter et al. |
| 5,838,876 A | | 11/1998 | Iwamura |
| 5,854,873 A | | 12/1998 | Mori et al. |
| 5,881,203 A | * | 3/1999 | Fujinami et al. ............ 386/125 |
| 6,009,237 A | * | 12/1999 | Hirabayashi et al. ........ 386/111 |

FOREIGN PATENT DOCUMENTS

| | | |
|---|---|---|
| EP | 0505985 | 9/1992 |
| EP | 0794667 | 9/1997 |
| EP | 0827336 A2 | 3/1998 |
| EP | 0866461 | 9/1998 |
| GB | 2308264 | 6/1997 |
| JP | 7-93873 | 4/1995 |
| JP | 8-7282 | 1/1996 |

OTHER PUBLICATIONS

U.S. Patent Application Ser. No. 09/414,958, filed Oct. 12, 1999, entitled "Information Recording Medium, Apparatus and Method for Recording or Reproducing Data Thereof", by Tomoyuki Okada et al., located in Group Art Unit 2712.

* cited by examiner

Primary Examiner—Vincent Boccio
(74) Attorney, Agent, or Firm—Wenderoth, Lind & Ponack, L.L.P.

(57) ABSTRACT

This invention provides a recording medium for recording various AV streams, which enables to perform a random access and is suitable for a DVD-RAM or the like, Also provided are an apparatus and a method for accessing the recording medium. The information recording medium stores, as management information, object information for managing an object. The object information includes an access map for managing an MPEG transport stream for each block unit which is comprised of the integer-times number of ECC blocks. The access map has, in addition to predetermined access information for the block, a flag indicating whether the block includes an I-picture or not.

15 Claims, 29 Drawing Sheets

Fig.8

| PROGRAM | RECORDING DATE & TIME |
|---|---|
| 1) The Foreign Movie Theater | 98.9.20 pm9 : 00- |
| 2) Morning Drama Series | 98.9.22 am8 : 30- |
| 3) World Cup Finals | 98.6.10 am2 : 00- |
| 4) Beethoven | 96.4.1 |

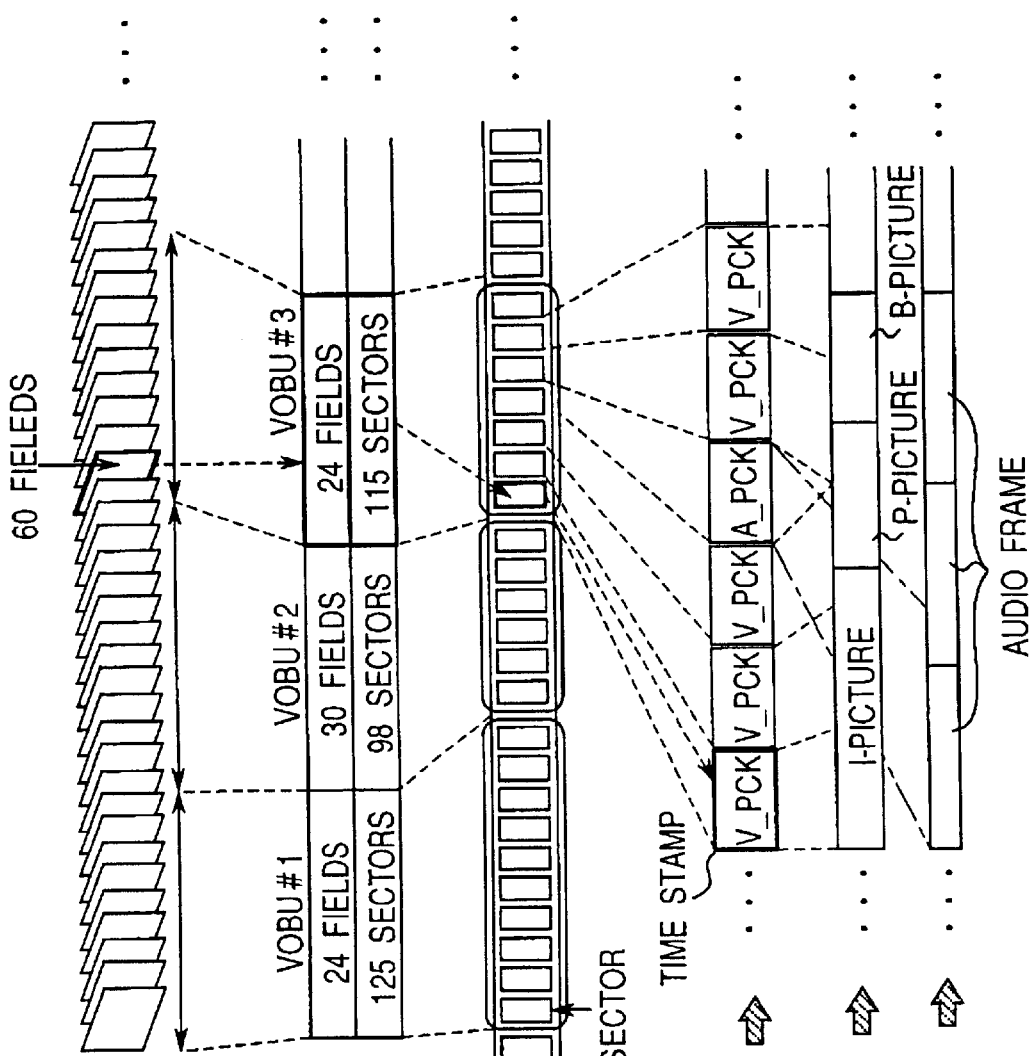

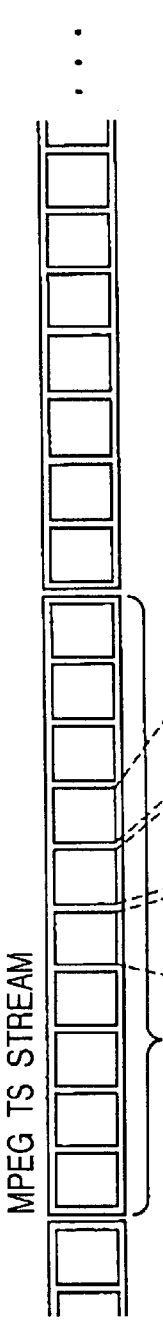
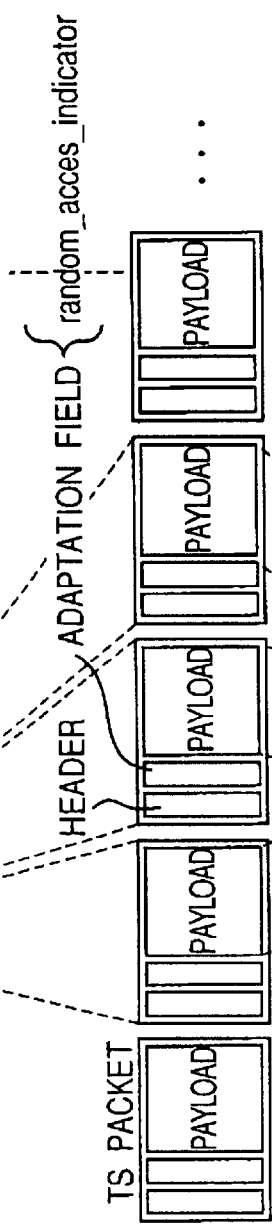
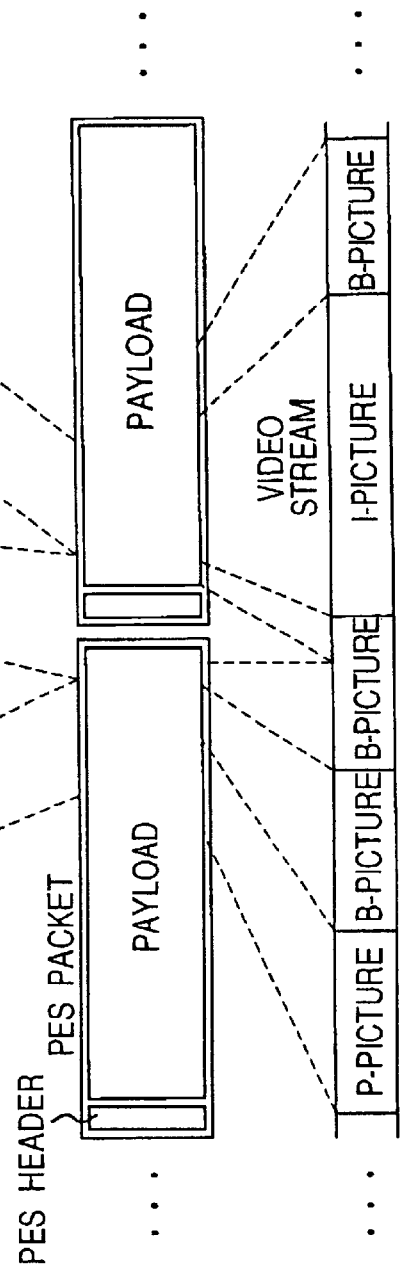
*Fig.14A*  *Fig.14B*  *Fig.14C*  *Fig.14D*

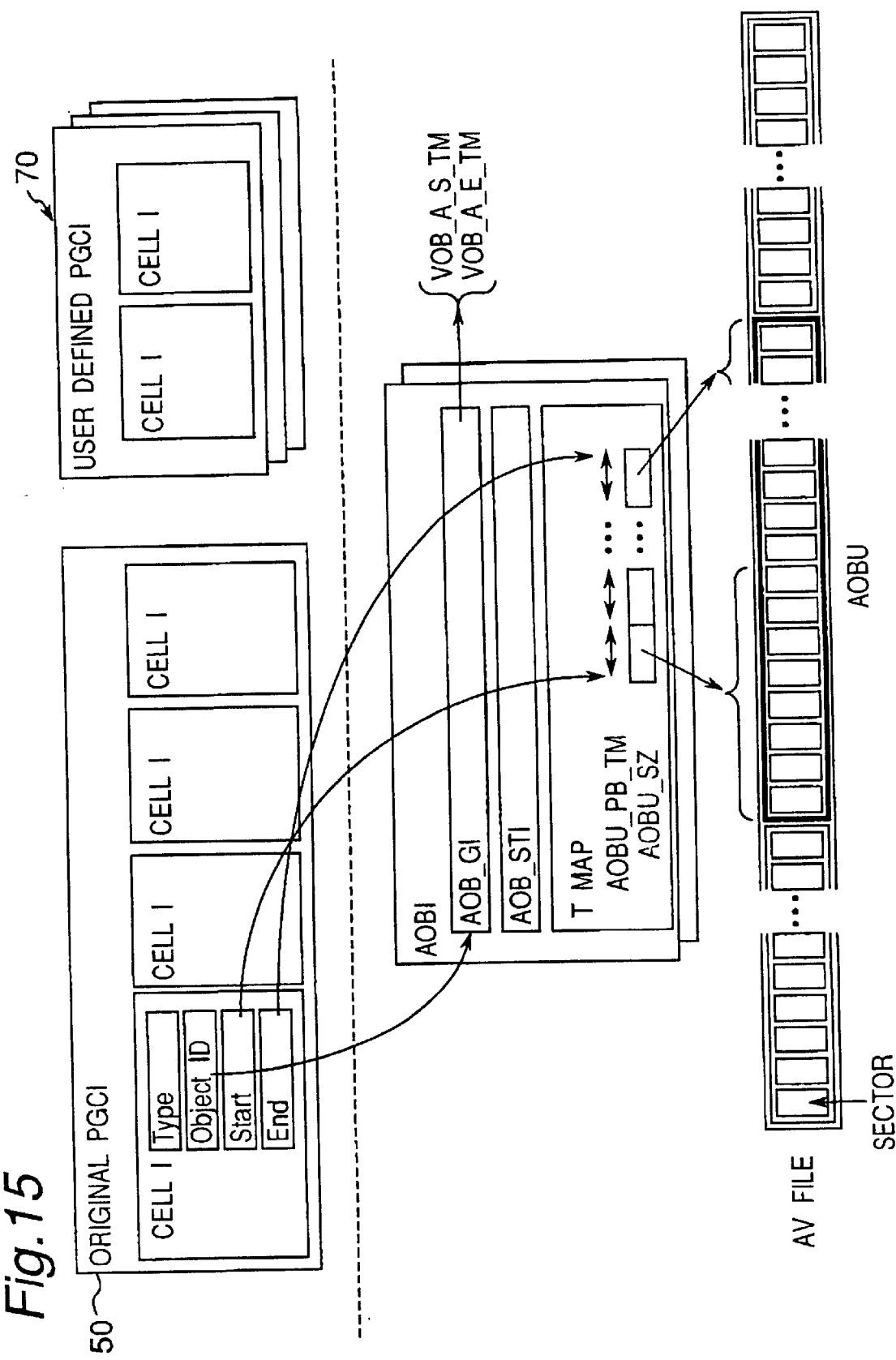

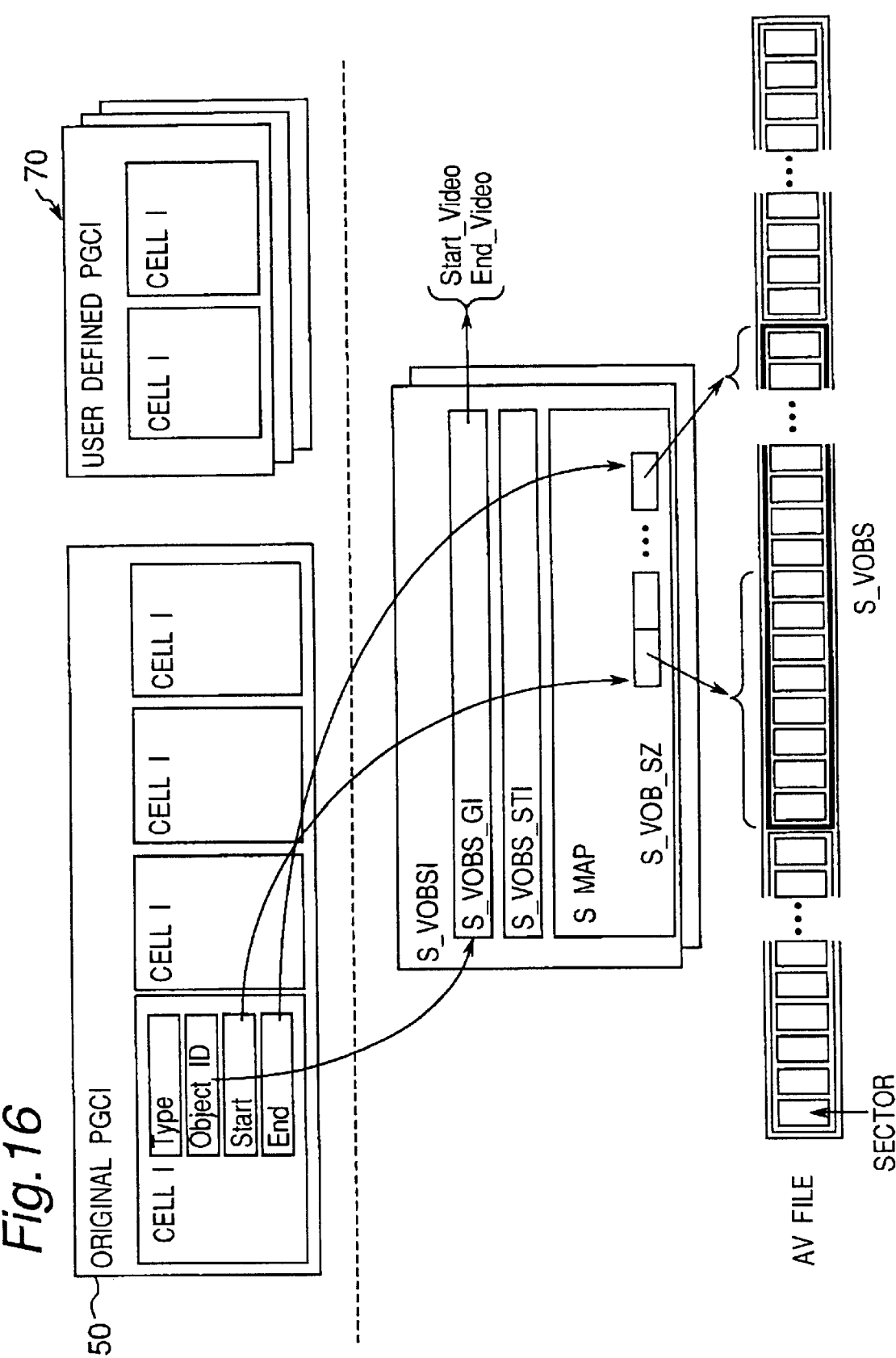

INFORMATION RECORDING MEDIUM, APPARATUS AND METHOD FOR RECORDING OR REPRODUCING DATA THEREOF

BACKGROUND OF THE INVENTION

1. Field of the Invention

The present invention relates to readable/writable information recording medium. More specifically, the present invention relates to an information recording medium for recording multimedia data in different kinds of formats such as movie image data, still picture data and audio data; and a data recording apparatus and replaying apparatus for the medium.

2. Related Art

Development of phase change type disc DVD-RAM has increased recording capacity of a rewritable optical disc from about 650 MB to a few GB. The DVD-RAM is now expected to become a medium not only for computers but also a recording/playing medium for audio/video (hereinafter abbreviated as AV) technologies in combination with standardization of a digital AV data coding technique called MPEG (MPEG2). Specifically, the DVD-RAM is expected to replace magnetic tape which has been a major

DVD-RAM

Advancement in high-density recording technology for rewritable optical discs in recent years has made it possible to store not only computer data and audio data but also image data as well.

Conventionally, land and groove are formed on a signal recording surface of the optical disc.

Signals used to be recorded only on the land portion or in the groove portion. Later, land-group recording method was developed for recording signals both in the land portion and in the groove portion, practically doubling the recording density. For example, a technique disclosed in Japanese Patent Laid-Open Publication No. 8-7282 is well known.

Another of such techniques is CLV (Constant Linear Velocity recording) method for improving recording density. From this technique, zone CLV method was developed and is now commercially practiced for simplified control in application. Japanese Patent Laid-Open Publication No. 7-93873 is a known example of this technique.

With such development in the optical disc for greater recording capacity, a technological challenge is how to record AV data including image data, thereby achieving new performances and functions that have never been realized by prior art AV apparatuses.

The development of the large-capacity rewritable optical disc is expected to replace the conventional tape medium for recording/playing AV data. The change from tape to disc will bring substantial changes in the function and performance of the AV equipment.

The biggest change to be brought by the disc is tremendous improvement in random access capability. If tape is to be accessed randomly, rewinding time of the tape, which is usually a few minutes per reel, must be taken into account. Such an access time is extremely slower than a seek time (which is shorter than a few tens of millisecond.) for the optical disc. Thus, in a practical sense, the tape cannot be a random access medium.

Such a superb random access capability of the optical disc can realize distributed recording of AV data in the optical disc, which was not possible with the conventional tape medium.

Referring now to the attached drawings, FIG. 1 is a block diagram of a DVD recorder drive unit. The drive unit comprises an optical pickup 11 for reading data stored in a DVD-RAM disc 100, an ECC (Error Correcting Code) processor 12, a one-track buffer 13, a switch 14 for selecting between input and output to and from the track buffer 13, an encoder 15, and a decoder 16.

As shown in the figure, the DVD-RAM disc 100 uses one sector (1 sector=2 KB) as a smallest unit of data recording, and one ECC block (1 ECC block=16 sectors) is used as a unit for error correcting operation performed by the ECC processor 12.

The track buffer 13 is a buffer for storing AV data at a variable bit rate to record AV data effectively in the DVD-RAM disc 100. Specifically, reading/writing for the DVD-RAM 100 is performed at a fixed rate (Va), whereas the bit rate (Vb) of AV data is varied according to complexity of contents (e.g. an image for video data). The buffer 13 absorbs difference between these two bit rates. When the AV data have a fixed bit rate such as in a video CD, then the track buffer 13 is not required.

If this track buffer 13 is used more effectively, distributed recording of AV data on the disc 100 becomes possible. This will be described more specifically here below, referring to FIGS. 2A and 2B.

FIG. 2A is a diagram showing address space on the disc. According to FIG. 2A, AV data is stored in a distributed manner, i.e. in a continuous area [a1, a2] and in another continuous area [a3, a4]. In such a case, the AV data can be replayed continuously supplying data stored in the buffer 13 to the decoder portion 16 while seek is being made from point a2 to point a3. This situation is shown in FIG. 2B.

The AV data starting from the location a1 are read, and then entered to the track buffer 13 from time t1, upon which time the track buffer 13 begins to output the data. Thus, the buffer 13 accumulates data at a rate equal to the difference (Va−Vb) between the input rate (Va) to the buffer 13 and the output rate (Vb) from the buffer 13. This situation continues until the retrieval reaches a2 represented by a time point t2, by which time the amount of data in the buffer 13 has accumulated to amount B(t2). From time t2 to time t3, until the data pickup operation is resumed from the area starting at a3, the amount of data B(t2) stored in the track buffer 13 is being consumed in order to keep the decoder 16 supplied with data.

In other words, when the amount of data ([a1, a2]) read before the seeking is greater than a certain volume, then the AV data can be continuously supplied without being interrupted by the seek.

The above description is for reading of data from the DVD-RAM, i.e. for a play back operation. The same goes with writing data to the DVD-RAM, i.e. for a recording operation.

As described above, with the DVD-RAM, continuous replaying/recording is possible even if AV data is stored in the distributed manner, as long as the amount of data on each continuous record is greater than a certain volume.

In order to enhance advantages of the large-capacity recording medium, i.e. DVD-RAM, a UDF (Universal Disc Format) file system is used in the DVD-RAM as shown in FIG. 3 to allow access to the disc by using a PC. UDF information is recorded in "Volume" area of the diagram. Details of the UDF file system is disclosed in the "Universal Disc Format Standard."

Prior-art AV Equipment

Next, description will be made for prior art AV equipment commonly used by many users.

FIG. 4 is a diagram showing relationships among conventional AV equipment, media and formats. For example, if a user wants to watch a video program, a videocassette must be loaded into a VTR, and the program must be viewed using a TV set. If the user wants to listen to music, then a CD must be loaded into a CD player or CD radio-cassette player, and the program must be listened through a speaker system or through headphones. Specifically, according to the conventional AV system, each format (video or audio) is paired with a corresponding medium, respectively.

For this reason, each time when listening or watching a program, the user must select an appropriate medium and change one to another AV equipment appropriate to the medium. This is inconvenient from the user's viewpoint.

Digitization

Meanwhile, along with recent popularization of digital technology, a DVD videodisc was introduced as package software, whereas satellite digital broadcast was introduced in the broadcasting industry. These developments are backed by digital technology innovation, especially by MPEG as an internationally accepted standard.

FIG. 5 is a diagram showing MPEG streams used in the DVD videodisc and the satellite digital broadcast mentioned above. The MPEG standard has a hierarchy structure as shown in FIG. 5. An important point to note here is that the MPEG stream eventually used by an application in the package medium such as the DVD videodisc is different from the MPEG stream in the communication medium such as the satellite digital broadcasting. The former is called "MPEG program stream", in which data transfer is made by the unit of pack, reflecting the size of a sector (2048 bytes in DVD video disc) as the unit of recording in the package software. On the other hand, the latter is called "MPEG transport stream", in which the unit of data transfer is a TS packet having a size of 188 bytes, reflecting the application to ATM (Asynchronous Transfer Mode) systems.

The MPEG is expected to eliminate borders between different AV media, as a universal coding technology of image signals and digital data. However, because of such small differences as described above, there is not yet any AV equipment or media capable of handling both the package media and communication media.

Changes Brought by DVD-RAM

Introduction of the large capacity DVD-RAM is a step forward to elimination of the inconvenience that users feel in conventional AV equipment. As described earlier, the DVD-RAM incorporated with the UFD file system is accessible from the PC. By using different pieces of application software on the PC, it is now possible to play varieties of contents such as video, still picture and audio programs on a single piece of equipment, i.e. the PC.

As shown in FIG. 6, the user can move a cursor with a mouse onto a file displayed on a screen, and then double-click (or single-click) to replay contents of the file such as a movie displayed in left-top area of the screen.

Such a convenience becomes possible by combination of flexibility offered by the PC and large storage capacity offered by the DVD-RAM.

Backed by increasing popularity of the PC in recent years a number of different AV data can now be handled fairly simply on the PC as shown in FIG. 6. However, even though number of PC users is expected to increase, the popularity and easiness of operation of the PC are not so high and simple as those of the home TV or home video systems.

It is therefore an object of the present invention to solve the following problems identified as hurdles to optimum performance of the optical discs such as the DVD-RAM, as an AV recording medium of the next generation.

A world to be realized by the DVD recorder would be a world in which the user can freely handle different formats and contents without caring about the differences, by using a single medium on a single piece of AV equipment as shown in FIG. 7.

FIG. 8 shows an example of a menu used in the DVD recorder. According to this menu, the user can select from 1) "The Foreign Movie Theater" recorded from satellite digital broadcasting, 2) "The Morning Drama Series", 3) "The World Cup Finals" each recorded from conventional terrestrial broadcasting, and 4) a Beethoven dubbed from a CD, on a TV screen without caring about the original medium or the recording format.

The biggest problem in developing such a DVD recorder as above is how to manage uniformly the AV data and streams of many different formats.

No special managing method will be necessary if only a limited number of existing formats are to be handled. However, a managing method capable of handling not only a number of existing formats but also new formats to be introduced in the future has to be developed in order to realize the above-mentioned world of DVD recorder.

Even so, certain difference between a future user interface and those incorporated in the capability of uniformly handling the different AV streams may create a certain level of inconvenience similar to the inconvenience described for the prior-art. Specifically, the user may have to perform different operation depending upon the contents or format.

It becomes a big problem to handle how received data digitized by, for example, digital broadcasting among various AV streams. Particularly, in the case of MPEG stream, there is no concept of random access in the middle of the steam, since MPEG is standardized for application to the broadcast or communication. Therefore, it is impossible to use sufficiently random accessibility which is the best characteristic of disc media when data is stored to the optical disc.

SUMMARY OF THE INVENTION

The present invention is made to solve the above problem, and therefore has an object to provide an information recording medium capable of recording MPRG stream which lacks random accessibility in the middle of the stream, together with different kinds of AV streams. The present invention is also directed to provide a recording apparatus and a reproducing apparatus for the information recording medium.

In a first aspect of the invention, a recording medium is provided for recording at least one of video data. The medium comprises an area storing video data and an area storing map information. The video data includes a plurality of pictures, each picture being encoded by one of an inter-picture encoding method and an intra-picture encoding method. The map information manages video data for each block having fixed data length. The map information includes an address information and flag information. The address information indicates an address of the block including the picture to be reproduced with each reproduction time. The first map has flag information which indicates whether or not each block includes at least a part of the intra-picture.

In a second aspect of the invention, an apparatus is provided for recording information on the information recording medium according to the invention. The apparatus comprises a unit for recording decoder input time information of a block on the first map correspondingly to a block number of the block, a unit for deciding whether or not the block includes at least a part of the intra-picture. and a unit for setting the flag for the block based on the decision and for recording the flag correspondingly to the block number.

In a third aspect of the invention, an apparatus is provided for reproducing information from the information recording medium according to the invention. The apparatus comprises a unit for finding entries of the first map corresponding to reproducing start and end positions designated by a user, respectively, with reference to decoder input time information in the first map, a unit for calculating addresses to specify the reproducing start position and the reproducing end position from the found entries, respectively, and a unit for reading video data from the recording medium based on the calculated addresses to reproduce the read video data.

In a forth aspect of the invention, a method is provided for recording information on the information recording medium according to the invention. The method comprises recording decoder input time information of a block on the first map, correspondingly to a block number of the block, deciding whether or not the block includes at least a part of the intra-picture, and setting the flag for the block based on the decision and for recording the flag correspondingly to the block number.

In a fifth aspect of the invention, a method is provided for reproducing information from the information recording medium according to the invention. The method comprises finding entries of the first map corresponding to reproducing start and end positions designated by a user with reference to decoder input time information in the first map, respectively, calculating addresses to specify the reproducing-start position and the reproducing-end position from the found entries, respectively, and reading video data from the information recording medium based on the calculated addresses to reproduce the video image data.

According to the information recording medium of the present invention, the transport stream sent by means of a digital broadcast can be recorded together with other AV streams, and furthermore, random access reproduction can be performed for the recorded digital broadcasting object. Moreover, information for identifying the validity of the flag indicative of inclusion of the coded image (I-picture) by the intra-picture coding manner is provided in the management information for managing the stream. Consequently, also in the case where the transport stream is recorded by a recorder having no stream analyzing capability for recording the transport stream, drawbacks are not caused during the reproduction of the recorded information.

According to the information recording apparatus and the information recording method of the present invention, the transport stream sent by the digital broadcast can be recorded on the information recording medium so as to reproduce data therefrom in random access method.

According to the information reproducing apparatus and the information reproducing method of the present invention, it is possible to perform the random access of the transport stream sent by the digital broadcast which is recorded on the information recording medium with other AV streams.

RELATED APPLICATION

This application is based on application No. 10-329032 filed in Japan, the contents of which is herein incorporated by reference.

BRIEF DESCRIPTION OF THE DRAWINGS

FIG. 8 is an example of a selection menu given by the DVD recorder.

FIGS. 13A 13B, 13C, 13D, 13E and 13F are diagrams describing a time map according to the present invention.

FIGS. 14A, 14B, 14C and 14D are diagrams each of which shows each stage of the MPEG transport stream.

FIG. 15 is a diagram showing relationships between an audio object (AOB), audio object information (AOBI) and PGC information (PGCI).

FIG. 16 is a diagram showing relationships among a still picture object (S_VOBS), still picture object information (S_VOBS), and PGC information (PGCI).

DETAILED DESCRIPTION OF THE PREFERRED EMBODIMENTS

With reference to the accompanying drawings, detailed description will be made for a DVD-RAM, a DVD recorder, and a DVD player as preferred embodiments of the present invention.

First Embodiment
(Logic Structure of Data on DVD-RAM)

The DVD-RAM according to the present invention makes possible to record and manage integrally AV data and AV streams of many different kinds of formats on a single disc. This allows it to record on a single disc AV streams of different formats including a terrestrial broadcasting TV program, a digital broadcasting TV program transmitted in the MPEG transport stream format, a video stream taken by a digital video camera, a still picture taken by a digital still camera, and video data coded in the MPEG program stream, and so on. Further, the data recorded in the DVD-RAM can be played in a given sequence. For this purpose, the DVD-RAM according to the present invention is provided with management information for managing the AV streams without depending on the types of format of the AV data or AV streams.

Figure 1:
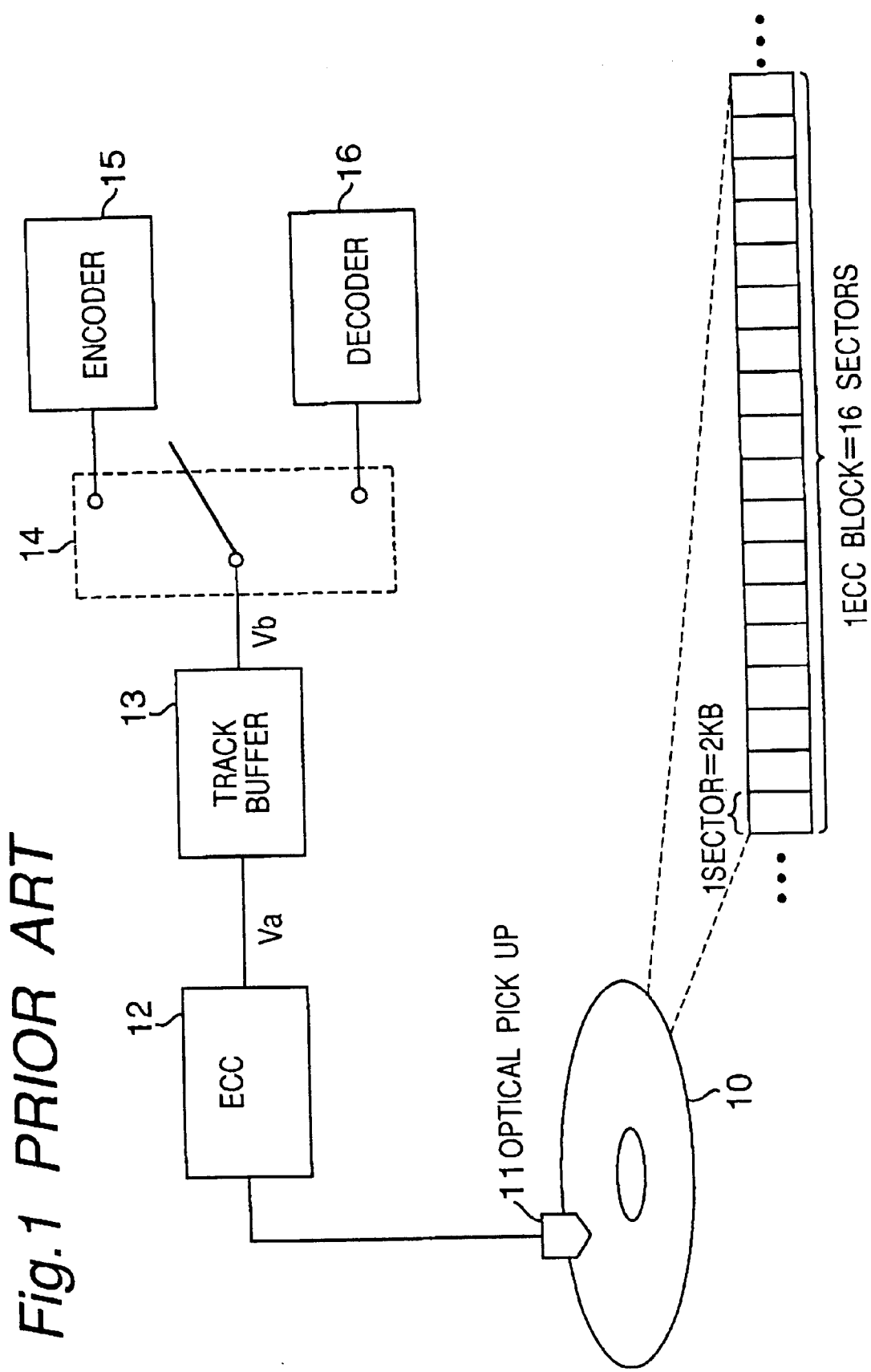
FIG. 1 is a block diagram of a drive unit of a DVD recorder.
Figure 2A:
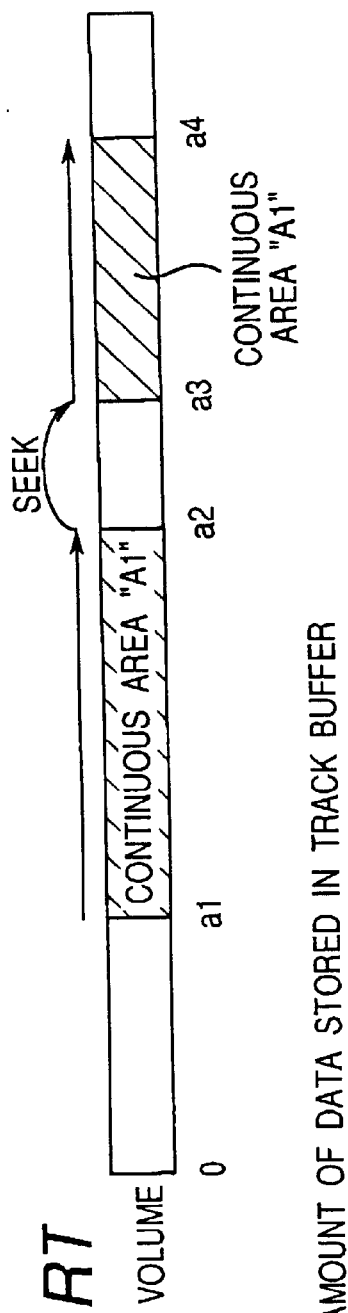
FIG. 2A is a diagram showing address space on a disc.
Figure 2B:
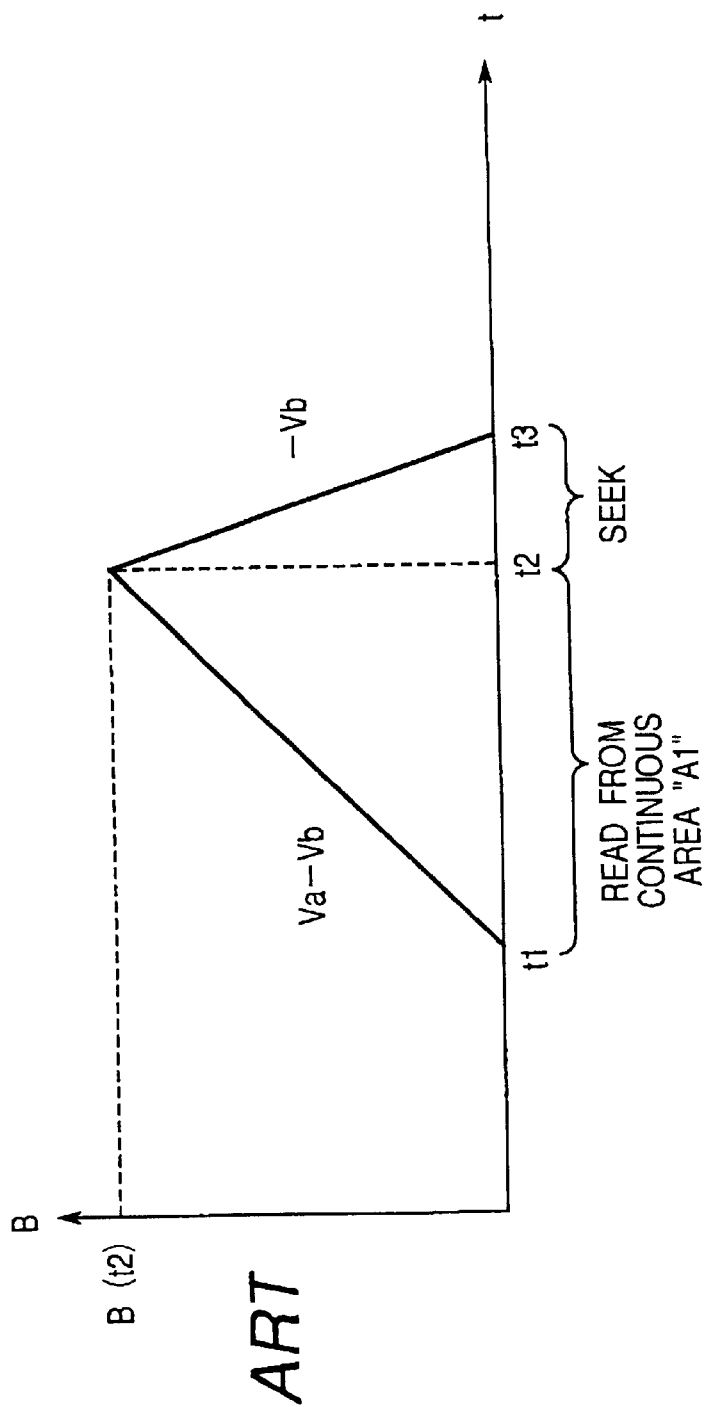
FIG. 2B is a diagram showing data accumulation in a track buffer.
Figure 3:
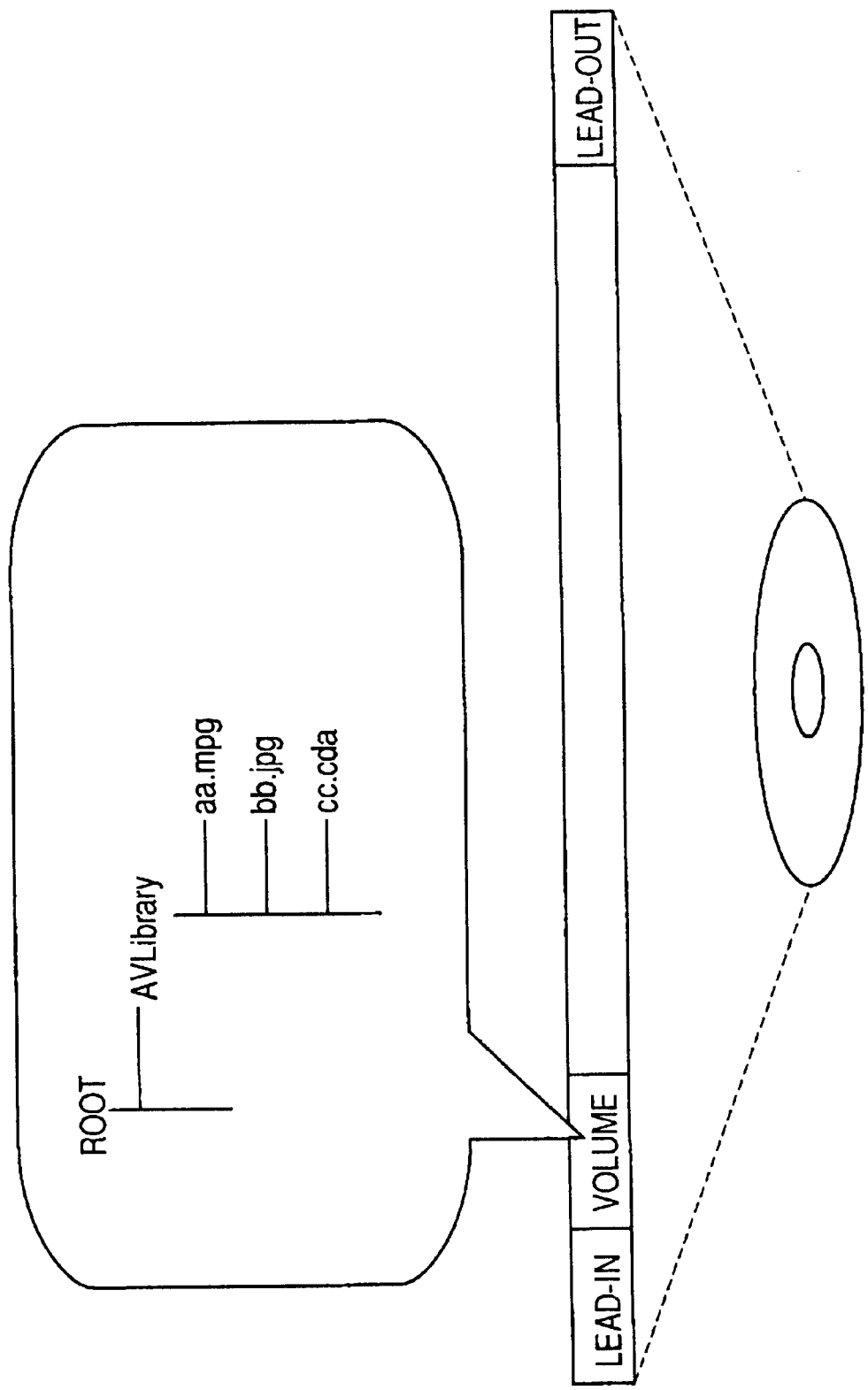
FIG. 3 is a diagram showing a file structure through a file system.
Figure 4:
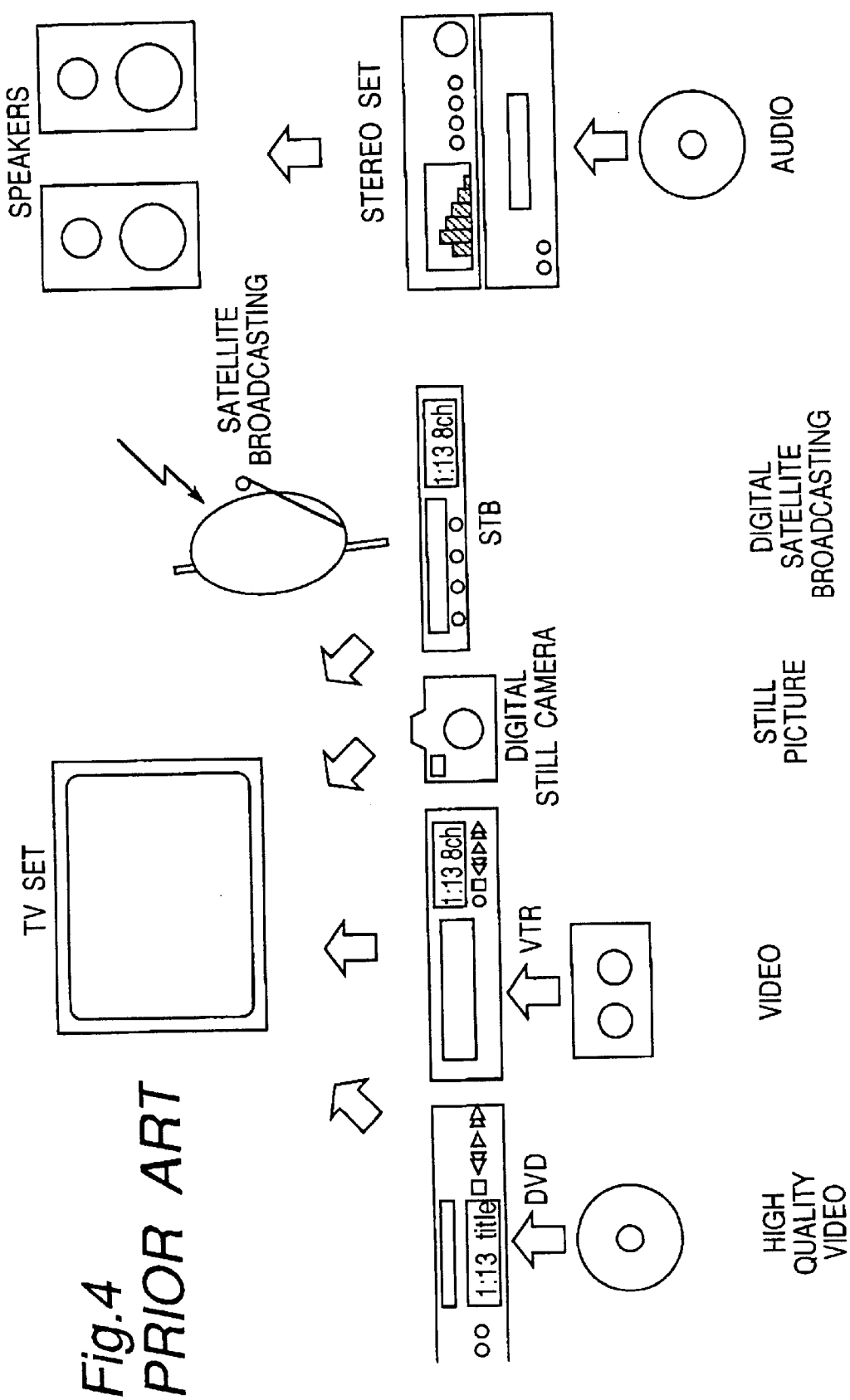
FIG. 4 is a diagram showing relationships among different kinds of prior art AV equipment and corresponding media.
Figure 5:
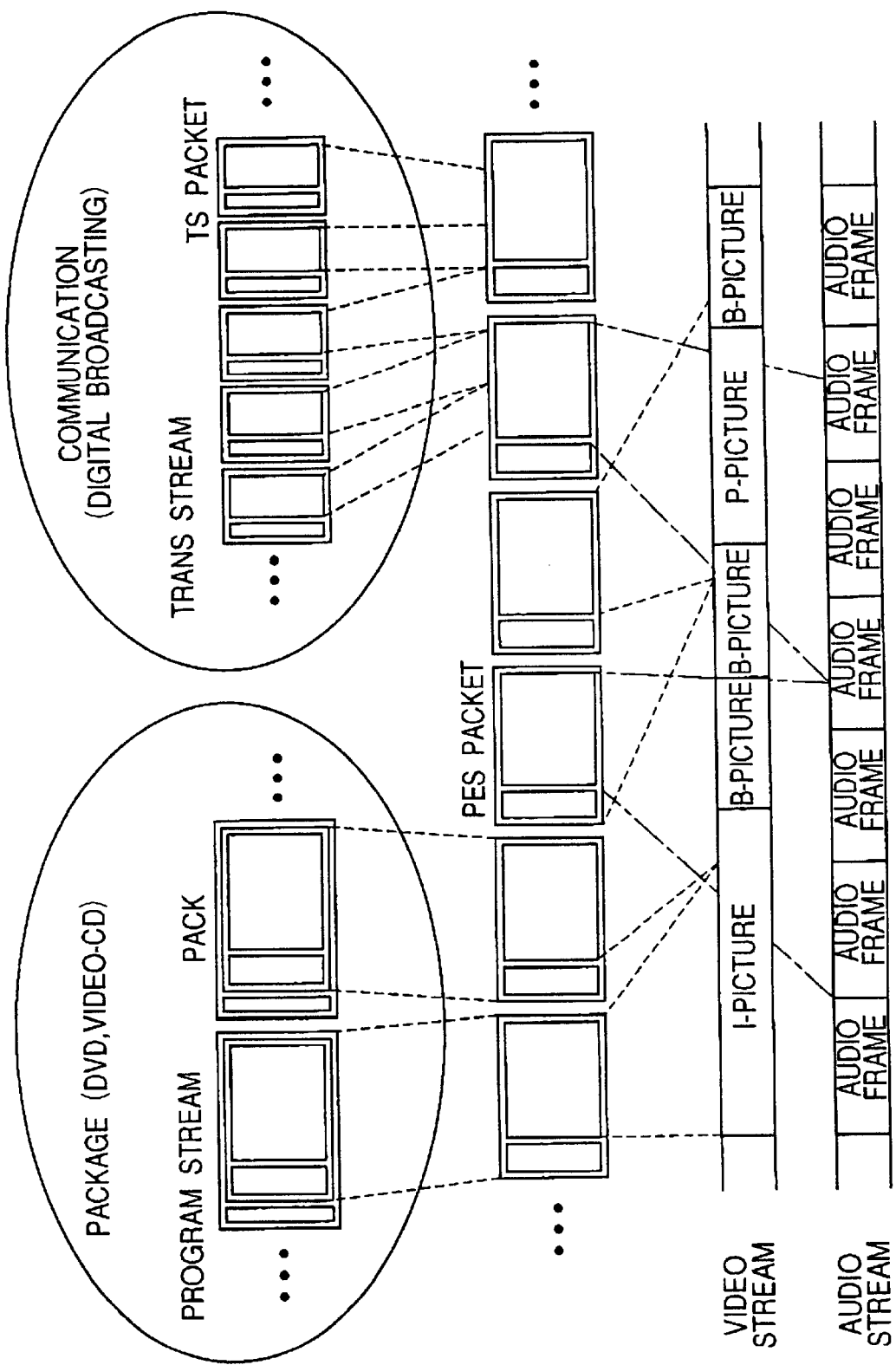
FIG. 5 is a diagram showing an MPEG program stream and an MPEG transport stream.
Figure 6:
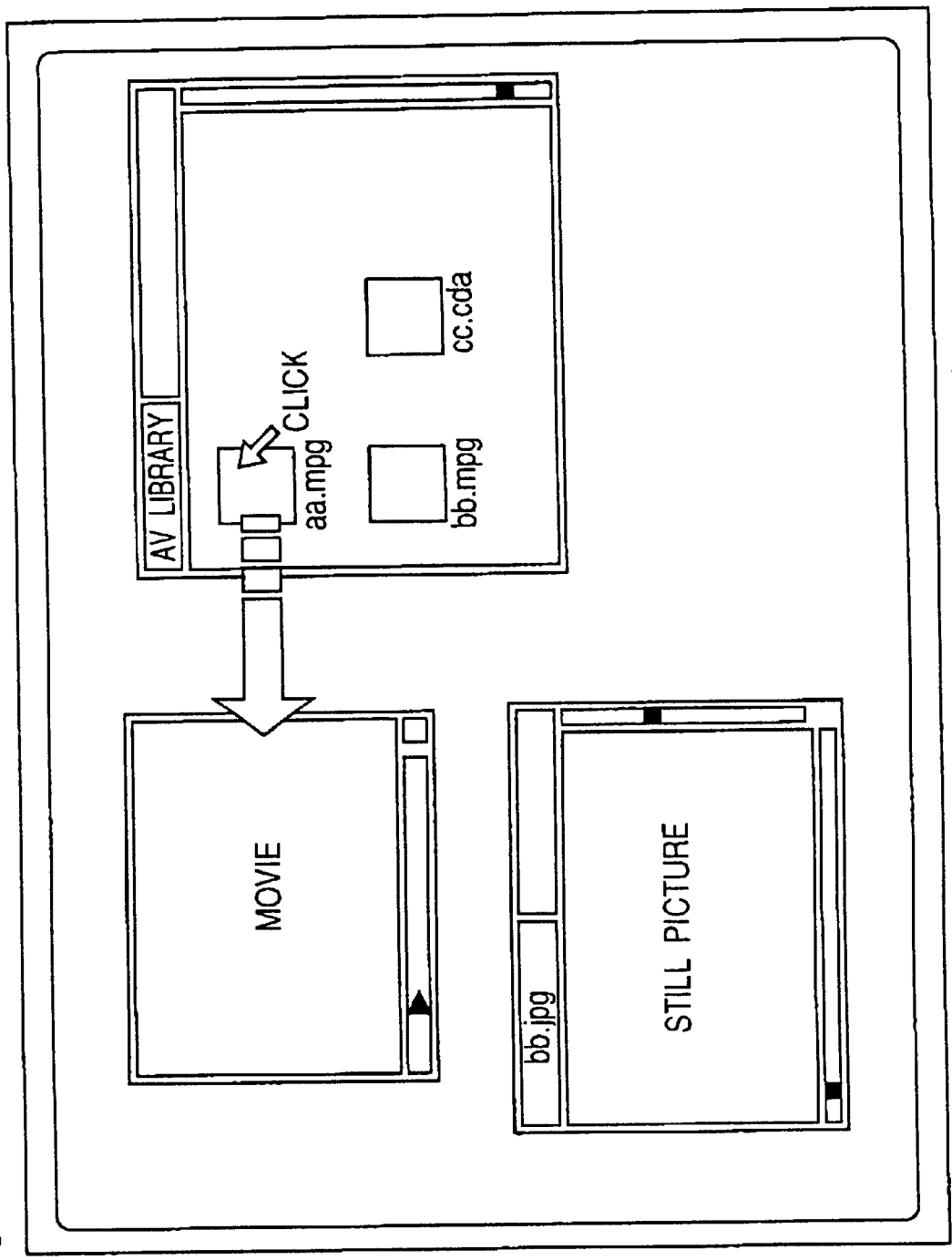
FIG. 6 is an illustration of a PC screen when an AV data file is being accessed on the PC.
Figure 7:
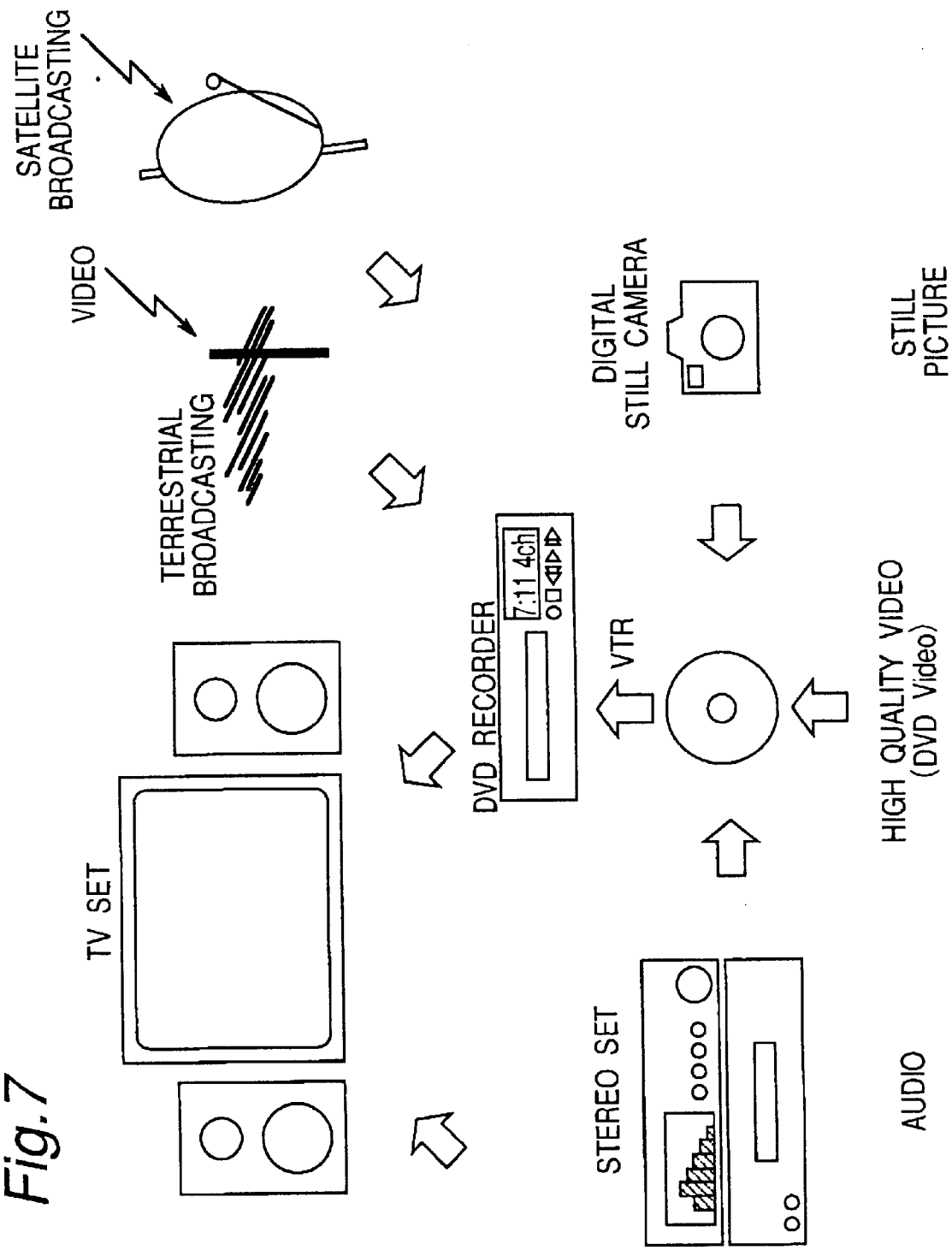
FIG. 7 is a diagram showing relationships to be created by a DVD recorder among different kinds of AV equipment.
Figure 9A:
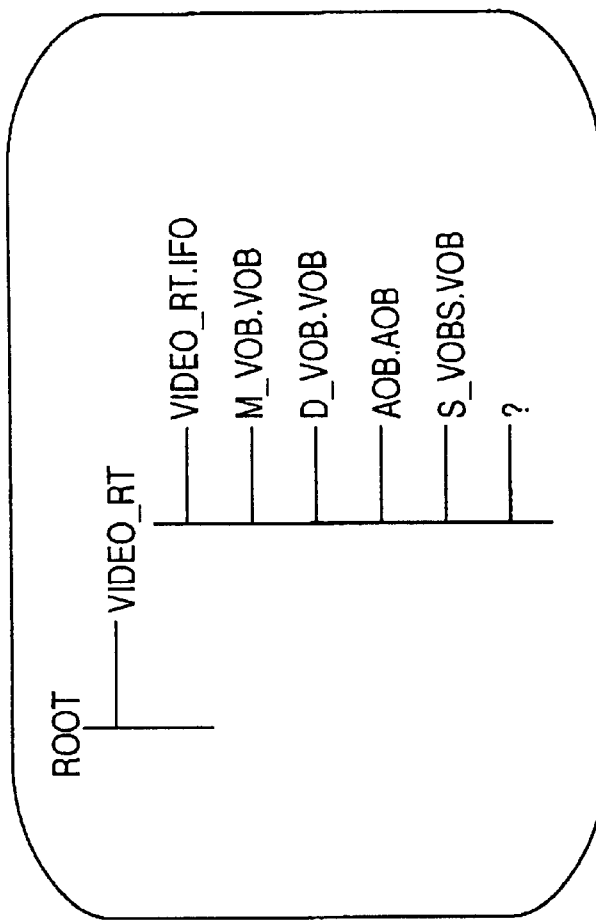
FIG. 9A is a diagram showing relationships between an AV file and a directory on the computer readable DVD-RAM disc.
Figure 9B:
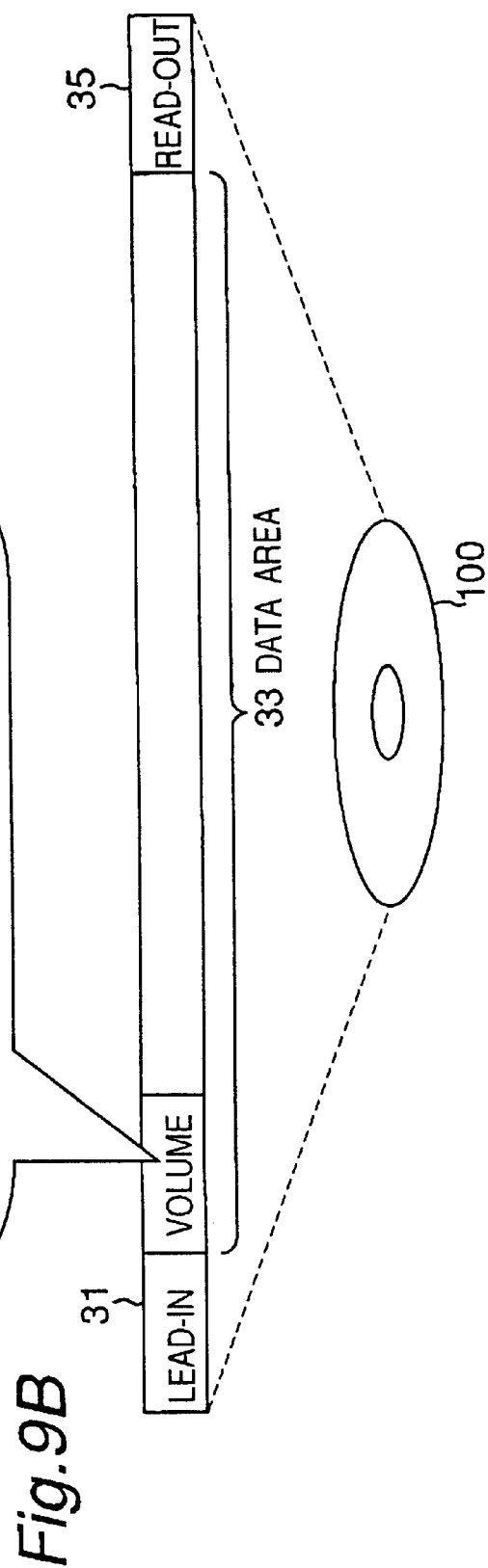
FIG. 9B is a diagram showing address space on the disc.

First, structure of the data recorded in the DVD-RAM according to the present invention is described with reference to FIGS. 9A and 9B. A diagram in FIG. 9A is a data structure of a DVD-RAM disc 100, which can be seen by a file system. FIG. 9B shows a structure of a physical sector in the disc 100.

As shown in the figure, a first portion of the physical sector is a lead-in area 31 which stores therein standard signals necessary for stabilizing servo mechanism, identification signals for differentiating from other media, and so on. The lead-in area 31 is followed by a data area 33 which stores logically available data. A last portion is a lead-out area 35 storing signals similar to those in the lead-in area 31.

A front portion of the data area 33 stores with volume information which is management information for the file system. Since the file system is a known technique, no details will be described herein.

The file system allows the data in the disc 100 to be handled as directories and files as shown in FIG. 9A. As understood from FIG. 9A, all the data handled by the DVD recorder is managed under VIDEO_RT directory immediately below the ROOT directory.

The DVD recorder according to the present embodiment handles two kinds of files, i.e. AV files containing audio-video data (AV data), and management information files containing information for managing the AV files. According to the example shown in FIG. 9A, the management information file is identified as "VIDEO_RT. IFO", whereas the AV files include a file "M_VOB.VOB" which contains movie data, "D_VOB.VOB" which contains image data from digital broadcasting, "AOB.AOB" which contains audio data, and so on. Each of these files will be detailed here below.

It should be noted here that according to the present embodiment, each AV stream is defined as an object ("Object"). Specifically, the objects may include a variety of AV streams such as MPEG program stream, MPEG transport stream, audio stream, still picture data, and so on. Each of these AV streams is abstracted as the object so that the management information of these AV streams can be defined as object information (Object I) of a universal format.
(Management Information)

First, the management information will be described referring to FIG. 10. The management information has object information 80 for management of recording locations of the object and attribute thereof, and program chain information (PGC information) 50 and 70 which define playback sequence, playback time and so on for data to be played back from the DVD-RAM.

The above-described abstraction is possible to the AV streams because the AV streams have time attribute and other elements in common, although each of the different formats has certain differences from the others. AV streams having a common format are stored in a same AV file in the order of recording.

The object information (Object I) 80 includes general information about the object (Object GI) 80a, attribute information of the object (Attribute I) 80b, and an access map 80c for converting the object playback time into addresses on the disc.

The access map 80c is necessary because the AV stream generally has two standards, i.e. a time domain and a data (binary digit string) domain, which do not have perfect correlation with each other. For example, in a video stream coded by MPEG-2 video which is now an international standard of the video stream, use of variable bit rate (a method in which the bit rate is changed depending on the level of complexity of an image) is becoming a mainstream. According to this method, there is no proportional relationship between the amount of data from the beginning and the accumulated length of playback time, and therefore random accessing cannot be performed based on the time axis. In order to solve this problem, the object information 80 has the access map 80c for conversion between the time axis and the data (binary digit string) axis. As will be described later, one object comprises a plurality of object units (VOBU), and therefore the access map 80c has data that correlates or associates the time region with the address region for each of the object units.

The PGC information 50, 70 are the information for controlling the playback of the object, i.e. image data and audio data. The PGC information 50, 70 represent a unit of data to be played back when the DVD player plays continuously data back. Specifically, each of the PGC information 50, 70 indicates an object to be replayed, and a playback sequence of cells 60, 61, 62 and 63. Each of cells 60, 61, 62 and 63 indicates any playback section of this particular object. The cells 60, 61 . . . will be described later in more detail. The PGC information comprises two kinds of information comprising an original PGC information 50 and a user defined PGC information 70. The original PGC information 50 is automatically generated by the DVD recorder upon recording the object so that all of the recorded objects are included. On the other hand, with the user-defined PGC information 70, the user can freely define the playback sequence. The PGC information 50 and 70 have the same structure and function differing only in that the user-defined PGC information 70 is defined by the user. Thus, description in further detail will be made only for the original PGC information 50.

Figure 10:
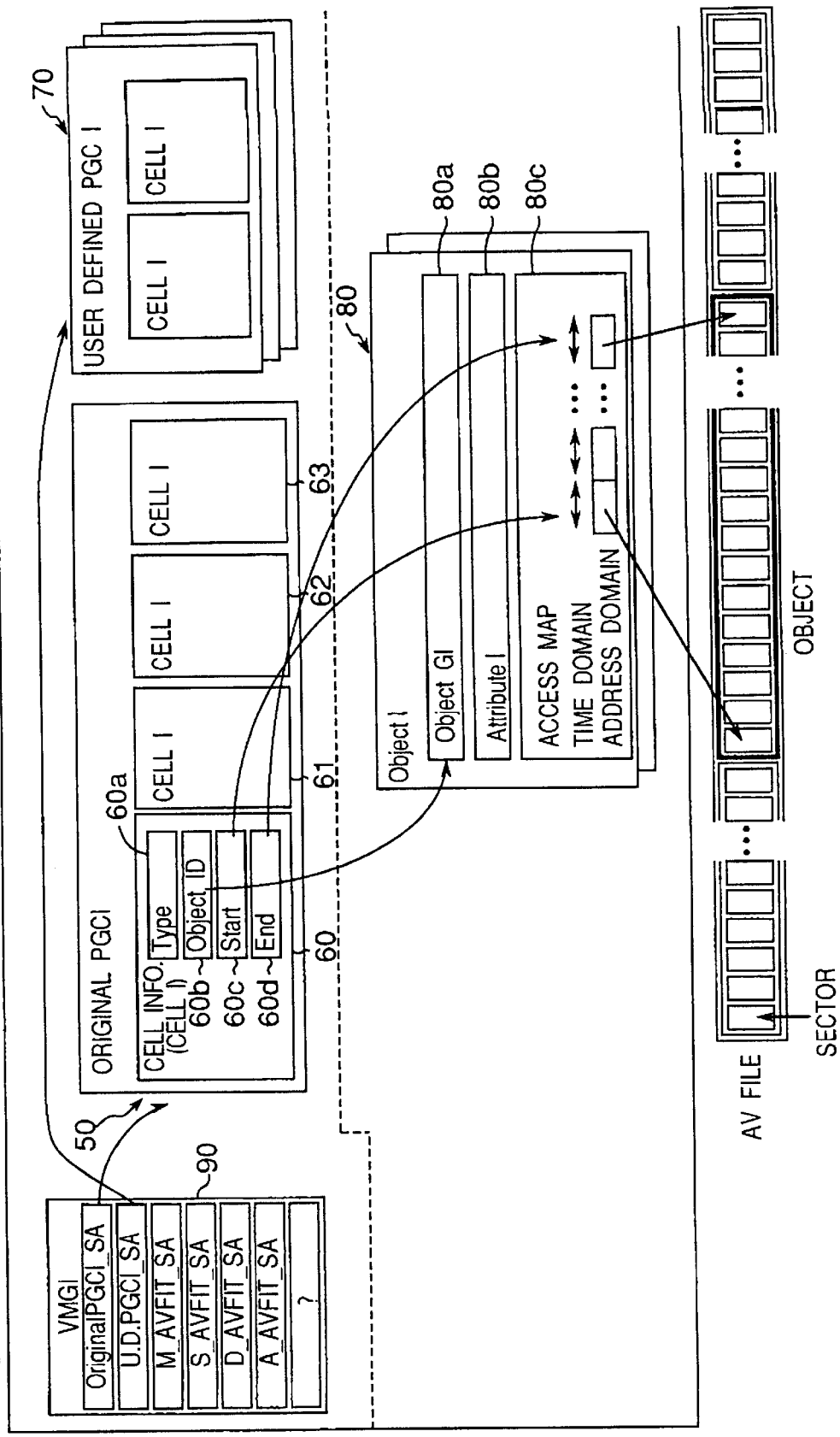
FIG. 10 is a diagram showing relationships among an object, object information and PGC information.

As shown in FIG. 10, the original PGC information 50 includes at lease one of the cell information. The cell information 60 . . . specifies an object to be replayed, and a replay section of the object. Generally, the PGC information 50 records a plurality of cells in a certain sequence. This recording sequence of the cell information in the PGC information 50 indicates the sequence in which the objects specified in respective cells are replayed.

Each cell, the cell 60 for example, includes type information ("Type") 60a which indicates the kind of object specified, an object identification (Object ID) 60b which identifies the object, starting position information ("Start") 60c on the time axis of the object, and ending position information ("End") 60e on the time axis in the object When the data is replayed, the cell information 60 in the PGC information 50 is read out successively, so that the object specified by the cell is replayed by successively playing portions of the object represented by the playback sections specified by respective cells.

(Subclasses of the Object Information)

Figure 11:
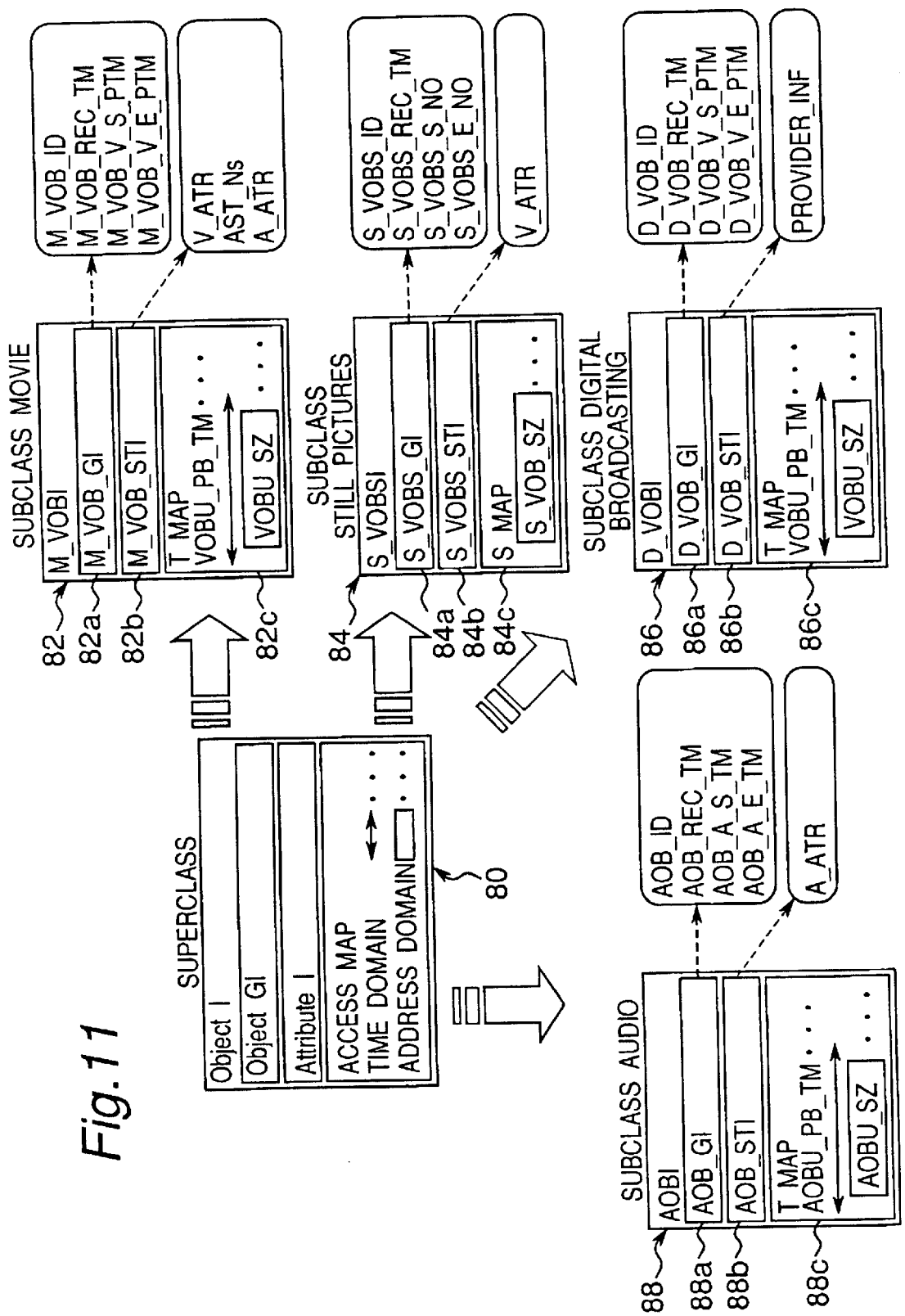
FIG. 11 is a diagram showing management information derived from the object information for each stream.

In order for the abstracted object information to be applied to an actual AV stream, a concretization must be provided. This principle may be understood easily as the class concept employed in an object-oriented model. More specifically, understanding will become easier if the object information is considered as a super-class, and more concrete structures created for each of the AV streams are considered as subclasses. FIG. 11 shows these concretized subclasses.

According to the present embodiment, as shown in FIG. 11, the object information has subclasses defined as a movie subclass, a still picture subclass, an audio subclass, and a digital broadcast subclass. Specifically, following subclasses are defined as concrete information: Movie object information (M_VOBI) is defined as the object information for video data (in MPEG program stream). Digital video object information (D_VOBI) is defined as the object information for digital broadcasting (in MPEG transport stream). Audio object information (AOBI) is defined as the object information for audio, and still picture video object information (S_VOBI) is defined as the object information for still pictures. Each of the above will be described here below.

The movie object information 82 includes MPEG program stream general information (M_VOB_GI) 82a, movie object stream information (M_VOB_STI) 82b, and a T map 82c.

The general information (M_VOB_GI) 82c includes movie object Identification information (M_VOB_ID), movie object recording time (M_VOB_REC_TM), movie object starting time information (M_VOB_V_S_PTM), and movie object ending time information (M_VOB_V_E PTM).

The movie object stream information (M_VOB_STI) 82b includes video stream information (V_ATR) having coding attributes of the video stream, the number of audio streams (AST_Ns), and audio stream information (A_ATR) having coding attributes of the audio stream.

The T map 82c includes a leading address of the movie object in the AV file, playback time (VOBU_PB_TM) and data size (VOBU_SZ) of each of the movie object units (VOBU). The movie object unit (VOBU) is the smallest unit to be accessed in the movie object (M_VOB), and will be detailed later.

The digital broadcast object information (D_VOBI) 86 includes MPEG transport stream general information (D_VOB_GI) 86a, stream information (D VOB_STI) 86b, and a T map 86c.

The general information of the digital broadcasting object (D_VOB_GI) 86a includes digital broadcasting object identification information D_VOB_ID), digital broadcasting object recording time D_VOB_REC_TM), digital broadcasting object starting time information D_VOB_V_S_PTM), and digital broadcasting object ending time information D_VOB_V_E PTM).

The digital video object stream information (D_VOB_STI) includes information (PROVIDER_INF) which contains additional information provided in the digital broadcasting. The T map 86c includes a leading address of the digital broadcasting object (D_VOB) in the AV file, playback time (VOB_PB_TM) and data size (VOBU_SZ) for each object unit (VOBU).

The audio object information (AOBI) 88 includes audio stream general information (AOB_GI) 88a, stream information (AOB_STI) 88b, and a T map 88c. The audio stream general information (AOB_GI) 88a includes audio object identification information (AOB_ID), audio object recording time (AOB_REC_TM), audio object starting time information (AOB_S_TM), and audio object ending time information (AOB_E_TM). The AOB stream information (AOB_STI) 88b includes audio stream information (A_ATR) having coding attributes of the audio stream. The T map 88c includes a leading address of the audio object in the AV file, playback time (AOBU_PB_TM) and data size (AOBU_SZ) for each audio object unit (AOBU). The audio object unit (AOBU) is the smallest access unit in the audio object (AOB), and will be detailed later.

Still picture object information (S_SOBSI) 84 includes still picture general information (S_SOBS_GI) 84a, still picture stream information (S_SOBS STI) 84b, and an S map 84c. The still picture general information (S_VOBS_GI) 84a includes still picture object identification information (S_SOBS_ID), still picture object recording time (S_VOBS_REC_TM), still picture object starting picture number (SVOBS_S_NO), and still picture object ending picture number (SVOBS_ENO). The still picture stream information (S_SOBS_STI) 84b includes still picture attribute information (V_ATR) having information about a compression format of the still picture object. The S map 84c includes a leading address of still picture object (S_VOBS) in the AV file, and data size (S_VOB_SZ) for each still picture.

As described above, a stream information table corresponding to each type of AV stream can be defined as shown in FIG. 11 by putting the abstracted object information into a more concrete data.

(Correspondence between Object Information and Cell Information)

Figure 12:
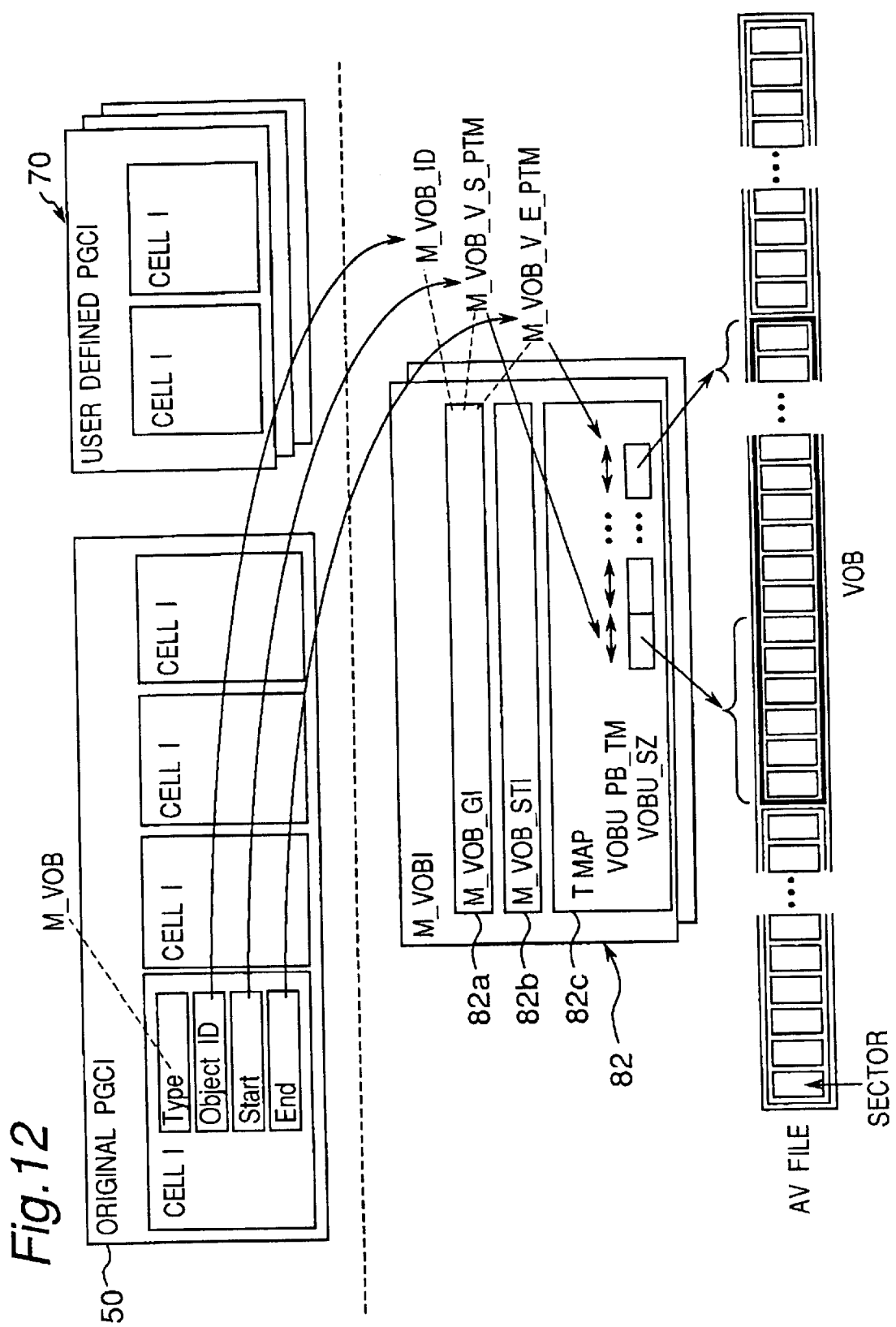
FIG. 12 is a diagram showing relationships among a movie object (M_VOB), movie object information (M_VOBI), and PGC information (PGCI).

Referring next to FIG. 12, the movie object information (M_MOBI), which is one of the concrete forms of the object information (Object I), is taken as an example to see correspondence with the cell information.

When the type information (Type) specified in the cell information has the value "M_VOB", this cell corresponds to a movie object. Likewise, when the type information has the value "D_VOB", then the cell corresponds to a digital broadcasting object, and when the type information has the value "AOB", then the cell corresponds to an audio object.

Based on the object ID (Object ID), the object information (VOBI) corresponding to the ID can be found. The object ID has a one-to-one correspondence to the movie object ID (M_VOB_ID) contained in the general information (M_VOB_GI) of the movie object information (M_VOB_I).

As described above, the object information corresponding to the cell information can be retrieved by using the type information (Type) and the object ID (Object ID).

The starting position information (Start) in the cell information corresponds to the start time information (M_VOB_V_S_PTM) of the movie object information. When the two values indicate a same time, it indicates that the cell is the first portion to be played of the movie object. On the other hand, when the starting position information (Start) has a value greater than that of the start time information (M_VOB_V_S_PTM), it indicates that the cell is to be played as a middle portion of the movie object. In such a case, the playback of the cell is delayed from the top of the object by the difference (time difference) between the start time information (M_VOB_V_S_PTM) and the starting position information (Start). The same relationship exists between the cell ending position information (End) and the end time information (M_VOB_V_E_PTM) of the movie object.

As described above, playback starting and the ending of a given cell can be obtained as relative points of time within the object by using the starting information (Start) and the ending information respectively in the cell information, and the start time information (M_VOB_V_S_PTM) and end time information (M_VOB_V_EPTM) respectively in the general information (M_VOB_GI) of the movie object information (M_VOBI).

The T map of the movie object is a table comprising a playback time and data size for each movie object unit (VOBU). By using the T map, the relative playback start time and the relative playback end time of a given cell within the movie object described above can be converted to address data.

Now, the address conversion using the T map mentioned above will be specifically described with reference to FIGS. 13A, 13B, 13C, 13D, 13E and 13F FIG. 13A shows movie objects (M_VOB) representing video display on the time axis. FIG. 13B shows the time map comprising the length of playback time and the data size for each movie object unit (VOBU). FIG. 13C shows the movie object expressed on the data (sector series) axis. FIG. 13D shows pack series as an enlarged portion of the movie object. FIG. 13E shows a video stream. FIG. 13F shows an audio stream.

The movie object (M_VOB) is an MPEG program stream. In MPEG program stream, a video stream and an audio stream are assembled into a packet (PES packet), and a plurality of the packets (PES packets) are packed into a sequence. In the example, one pack contains one packet (PES packet), and a pack is allocated with one sector (=2048B) for easier access. Further, packed video packs (V_PCK) and audio packs (A_PCK) are multiplexed into a single stream. All of these are illustrated in FIG. 13C, 13D, 13E and 13F.

Further, an MPEG system stream (a general term for the program stream and transport stream) contains time stamps for synchronized playback of the multiplexed video and audio streams. The time stamp for the program stream is PTS (Presentation Time Stamp) which indicates the time when the frame is to be played. The movie object start time information (M_VOB_V_S_PTM) and the movie object end time information (M_VOB V_E_PTM) mentioned earlier are time information obtained from the PTS. On the other hand, the time stamp for the transport stream is PCR (Program Clock Reference) which indicates the time of input of data to the buffer.

The movie object unit (VOBU) is described below. The movie object unit (VOBU) is the smallest access unit within the movie object (M_VOB). In order to accomplish highly efficient image compression, the MPEG video stream uses not only image compression using spatial frequency characteristics within a video frame but also image compression using motion characteristics between the frames, i.e. motion characteristics on the time axis. This means that expansion of a video frame requires information on the time axis, i.e. information about a future video frame or a past vide frame is required, or that the video frame may not be expanded by itself. In order to solve this problem, in MPEG video stream, a video frame (called I-picture) having no motion characteristics on the time axis is inserted every about 0.5 second, achieving higher random accessibility.

The movie object unit (VOBU) includes some packs from a pack containing the leading data of an I-picture to a pack immediately before a pack containing the leading data of the next I-picture. Thus, the T map comprises the data size (the number of packs) of each object unit (VOBU) and the playback time (the number of fields) of the video frames within the object unit (VOBU).

For example, an assumption is made that the value of Start in the cell differs from the value of start time information (M_VOB_V_S_PTM) of the movie object by one second (60 fields).

Now, the playback start time of each object unit in the movie object (M_VOB) can be obtained by accumulating the playback time (length) of each object unit (VOBU) in the T map from the first movie object. Likewise, the address of each object unit in the movie object (M_VOB) can be obtained by accumulating the data size (the number of packs) of each object unit from the first object unit.

According to the present embodiment, the first three object units (VOBU) of the movie object (M_VOB) have 24, 30 and 24 fields respectively. Thus, from the above calculation method, the video frame after one second (60 fields) from the top of the movie object (M_VOB) is found to be included in the third object unit (VOBU#3). Likewise, the start address of the third object unit (VOBU#3) is found to be the 223rd sector from the head of the object since these object units (VOBU) respectively have data sizes of 125, 98 and 115 sectors.

Adding the obtained address value to address value for 5010 sectors which is the M_VOB start address (ADD_OFF) within the AV file provides the start address of the data to be played.

In the above example, assumption is made that the video frame which is the 60th field from the top of the movie object (M_VOB) is to be played. As mentioned earlier however, the MPEG video does not allow decoding or playback from any one of all video frames. For this reason, the playback starts from the top of the object unit (VOBU) shifted by 6 fields away from the 60th field so that the playback starts from the I-picture. It should be noted that a playback can be started exactly from the video field specified by the cell by decoding the above 6 fields without displaying.

The method described above can also provide playback end time of the movie object corresponding to the end location in the cell information, and the address of the movie object in the AV file.

Next, the digital broadcasting object information (D_VOBI) will be described. The digital broadcasting object information is basically the same as the movie object information because the digital broadcasting object is a subclass derived from the object information. A big difference, however, is that the movie object (M_VOB) is created by recording a terrestrial broads ting. Specifically, while the movie object is an AV stream encoded by the recorder itself, the digital broadcasting object D_VOB) is not an AV stream encoded by the recorder itself since in the digital broadcasting object data transmitted from a digital broadcast satellite is recorded directly.

More specifically, when encoding is made by the recorder, internal structure of the stream is clearly known; however, when the data is a result of direct recordings, internal structure is not known unless the stream is not analyzed, and therefore it is impossible to make the T map.

It is possible to analyze the MPEG transport stream supplied through the digital satellite broadcast. In the present embodiment, the T map is created by using information within the MPEG transport stream as to be described here below.

FIG. 14A shows an MPEG transport stream. FIG. 14B shows an enlarged view of transport packets. FIG. 14C shows PES packets. FIG. 14D shows a video stream.

As shown in FIG. 14A, the MPEG transport stream comprises a series of transport packets. The transport packet includes a header, an adaptation field, and a payload. The adaptation field includes a random access indicator ("random_access_indicator"). The random access indicator indicates that in this transport packet or the following transport packet (more precisely, the transport packet having the same program ID), a next PES packet (i.e. the PES packet in which the first byte of the PES packet appears first) contains an access point of the video stream or the audio stream. Particularly, for the video stream, this indicates that the I-picture is included.

This random access indicator can be used for determining the video object unit, and creating the T map.

The transport packet has a fixed size of 88 bytes. Therefore, a plurality of transport packets (2048 bytes/188 bytes=10 TS packets) are recorded in one sector of the DVD-RAM comprising 2048 bytes. While it is possible to handle as 1 pack=1 sector in the movie object (M_VOB), it is impossible in the digital broadcasting object (D_VOB). Data reading/writing in the DVD-RAM can only be made by the sector. Therefore even in the digital broadcasting object, information in the T map is made up of the playback time length of the movie object unit (VOBU) expressed by the number of video fields, and the data size of the movie object unit expressed by the number of sectors.

For the above reason, accuracy of the address is not secured in the T map when the movie object unit is defined to be from a transport packet to the next transport packet. Therefore, the movie object unit (VOBU) is defined by using the sector containing the transport packet.

A PROVIDER_INF field of the digital broadcasting object stream information (D_VOB_STI) includes and ID for identifying a broadcasting company and particular information related to each broadcasting company.

Referring now to FIG. 15, description will be made for the audio object information (AOBI). Again, as a subclass derived from the object information, the audio object information is basically the same as in the case of the movie object information. A big difference, however, is that the audio object is an object for the audio system only and is not formatted into the MPEG system stream. More details will be described here below.

Since the audio object is not formatted into the MPEG system stream, no time stamps are included in the audio object. Therefore, there is no reference time for indicating the playback start time or the playback end time of the cell or the object. Thus, the audio object start time (AOB_A_S_TM) in the audio object general information (AOBI_GI) is entered with 0, whereas the audio object end time (AOB_A_ETM) is entered with the playback time length. Further, each of the Start field and the End field in the cell information is entered with relative time within the audio object.

Another difference of the audio data from the MPEG video data is that playback of the audio data can be started at any audio frame unit. Therefore, the audio object unit (AOBU) can be defined as the audio frame multiplied by any integer. If the audio object unit is too small, however, a huge amount of data must be handled in the T map. So, the audio object unit is made to be almost same length of the object unit of the movie object, which is about 0.5 second. The T map manages the playback time length and the data size for each audio object unit.

Referring now to FIG. 16, description will be made for the still picture object information (S_VOBSI). Again, as a subclass derived from the object information, the still picture object information (S_VOBSI) is basically the same as in the case of the movie object information. A big difference, however, is that the still picture object is an object including data of a plurality of sill pictures, and that the still picture object is not formatted into the MPEG system stream. More details will be described to, the audio object information here below.

The still picture, differing from the movie or the sound, does not have time information. Thus, fields of the starting information and the ending information in the still picture object general information (S_VOBS_GI) are entered with a number representing the starting still picture (Start_Video) and a number representing the last still picture (End_Video) respectively. Further, the Start field and the End field in the cell are entered with respective picture numbers within the still picture object instead of the time information.

The smallest access unit in still pictures is the frame of still picture. Thus, the S map is defined as the access map, which is a table containing the data size (S_VOB_SZ) of each still picture.

Figure 17:
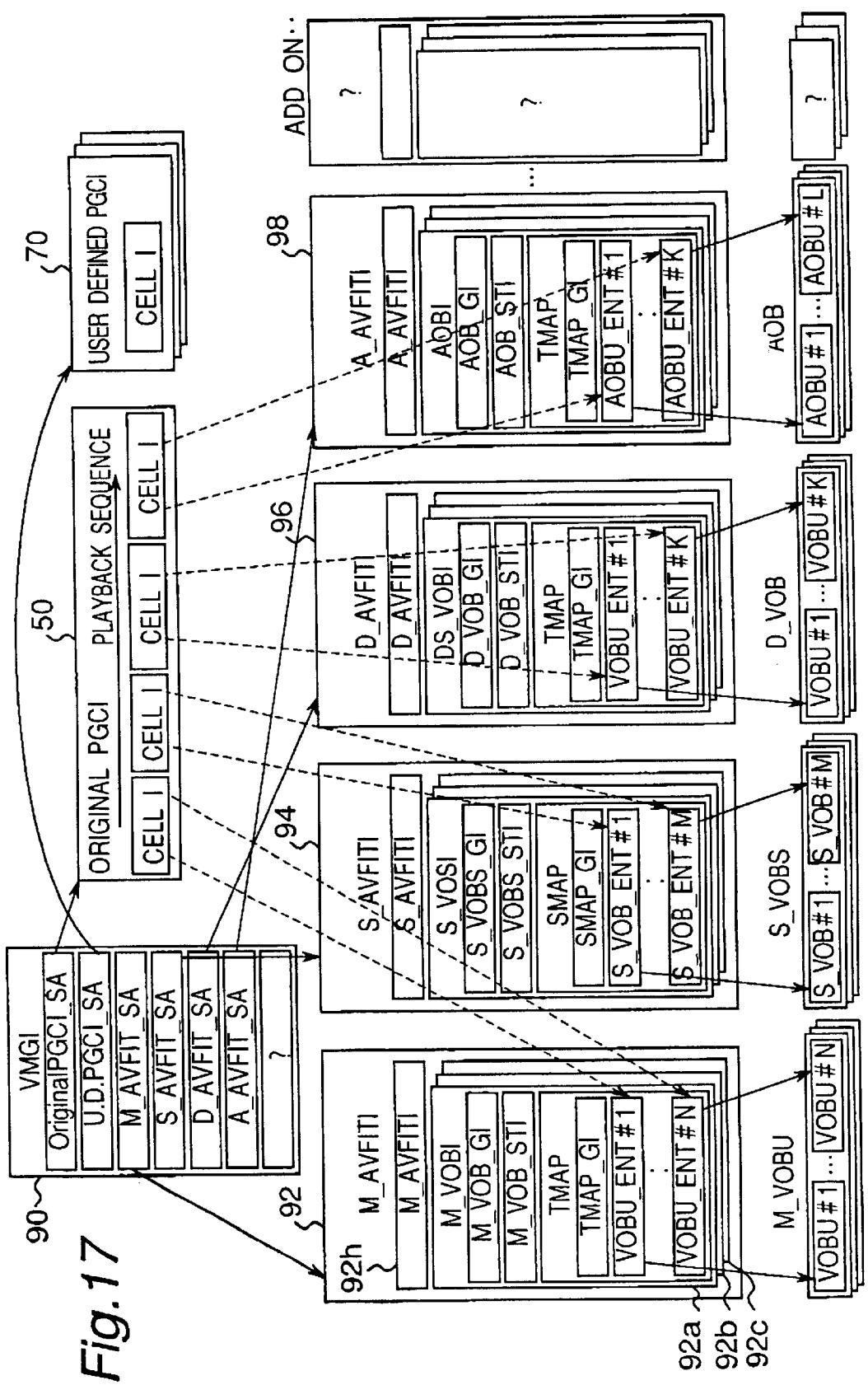
FIG. 17 is a diagram describing management information in a DVD-RAM.

The overall data structure described so far above is shown in FIG. 17. FIG. 17 shows the entirety of the management information in the DVD-RAM. With reference to FIG. 17, all of the management information will be described here below. As shown in FIG. 17 the DVD-RAM according to the present embodiment is provided with video manager general information (VMGI) 90 and a variety of information tables 92, 94, 96 and 98 in addition to the PGC information 50 and 70.

The VMGI 90 is management information for the whole disc, which contains pointer information, i.e start addresses, of the original PGC information 50, the user-defined PGC information 70, and the variety of file management tables 92, 94 , , , . Access to these tables 50, 70, 92, 94 , , , becomes possible by referring to the pointer information.

Now, the file management tables 92, 94, 96 and 98 shown in FIG. 17 will be detailed here. Each of these tables 92, 94, 96, 98 is a table for managing data files comprising the objects, and is prepared for each kind of objects. For example, the table 92 is for man ging the movie files containing movie objects, whereas the table 94 is for managing the still picture files containing still picture objects.

As described above, the object information is identified based on the object ID stored in the cell information in the PGC information. During this operation address of the object information is identified via the file management table 92, 94, 96 or 98. For this purpose, each of the file management tables 92, 94, 96, 98 contains information about the number of objects under management, ID's of the objects, the size of each object information, and so on. For example, when the object ID shows a sequent order, based on this object ID specified by the cell information, it is possible to determine an order of the object specified by the cell information in the object information managed by the file management table. Then, from the order of this determined object information and the file size, an offset based on the start address of the file management table can be calculated to obtain logical address of this determined object information.

As shown in FIG. 17, the movie file management table 92 is a table for managing movie files containing movie objects. The movie file management table 92 includes the movie object information (M_VOBI) 92a, 92b, . . . , and the table managing information (M_AVFITI) 92h containing the number of movie object information and the size of the movie objects managed by the table 92. The disc successively records same number of movie object information as the number of movie object information contained in the information 92h. As mentioned earlier, the movie object information 92a , , , each includes the general information (M_VOB_GI), stream information (M_VOB_STI), and the T map. Further, the T map includes the display time and size (VOBU_ENT) for each object unit (VOBU).

The same structure is used in a table (S_AVFIT) 94 for managing still picture files containing still picture objects, a table (D_AVFIT) 96 for managing digital broadcasting files containing digital broadcasting objects, and a table (A_AVFIT) 98 for managing audio files containing audio objects.

The original PGC information 50 contains the cell information 61, 62, 63, in the order of playback. The cell information contains information corresponding to the object information (type and object ID) and the playback section information (Start and End) within the object. The playback section information shown in the cell can be converted to address information of the object substance through the access map in the object information.

As described earlier, the original PGC information 50 differs from the user-defined PGC information 70 only in that the original PGC information 50 is automatically generated by the recorder so that all of the objects recorded in the disc will be played whereas the user-defined PGC information 70 is information in which the user can freely define the playback sequence. Thus, the user-defined PGC information 70 has the same structure with the original PGC information 50.

By abstracting in advance the information for managing the AV streams, it becomes possible to define the playback control information such as the PGC information and cell information without depending on the information peculiar to a given AV stream format, making possible to integrally manage AV streams. Thus, environment can be realized in which users can play AV data without paying attention to the AV format.

Further by using the above-described data structure, a new AV format can be easily incorporated into the data structure in DVD-RAM by simply defining the management information derived from the object information in the same manner as the other existing AV formats.

(Player Model)

Figure 18:
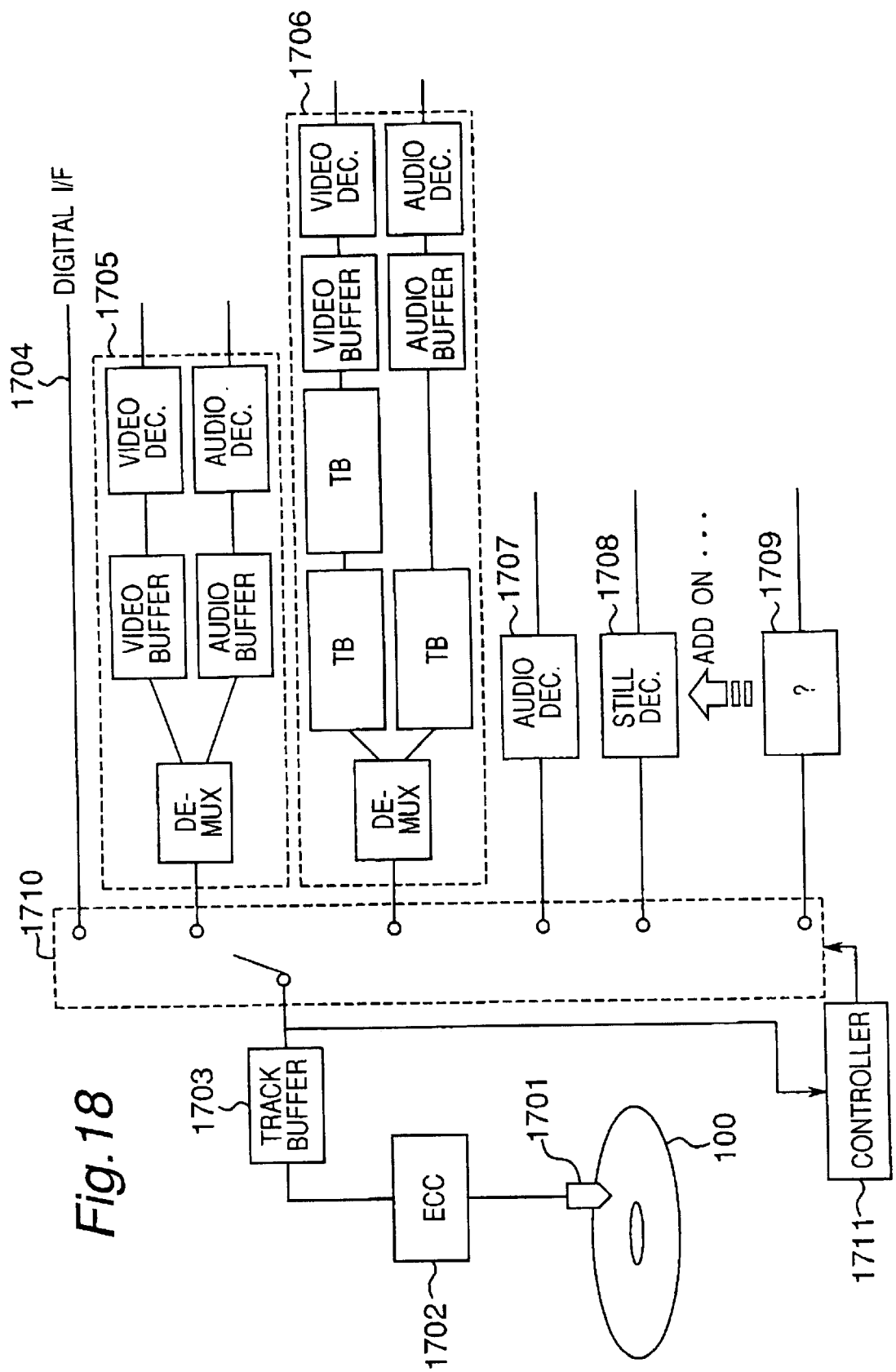
FIG. 18 is a block diagram of a player model according to the present invention.

Referring now to FIG. 18, a player model for playing the above optical disc is described. As shown in FIG. 18, the player comprises a pickup 1701, an ECC processor 1702, a track buffer 1703, a PS decoder 1705, a TS decoder 1706, an audio decoder 1707, a still picture decoder 1708, a switch 1710 and a controller 1711. The optical pickup 1701 reads out data from the optical disc 100. The ECC processor 1702 performs error correction and other operations to the read data. The track buffer 1703 tentatively stores the data after the error correction. The PS decoder 1705 decodes to play program streams such as the movie object (M_VOB). The TS decoder 1706 decodes to play transport streams such as the digital broadcast object (D_VOB). The audio decoder 1707 decodes to play the audio object (AOB). The still picture decoder 1708 decodes to play the still picture object. The switch 1708 switches among the decoders 1705, 1706 , , , for entry of data. The controller 1711 controls each component of the player.

The data recorded on the optical disc 100 is read by the pickup 1701, goes through the ECC processor 1702, and stored in the track buffer 1703. The data stored in the track buffer 1703 is then entered into one of the decoders 1705, 1706, 1707 and 1708, and then decoded to be outputted therefrom. In this switching operation, the controller 1711 checks the read data and sees the type information of the cell information in the PGC information providing the playback sequence according to the method described earlier. The switch 1710 is controlled to switch according to the type information so that the read information is sent to an appropriate decoder.

The player of the present embodiment further comprises a digital interface 1704 for supplying the AV stream to external equipment. Through this interface with an appropriate communication protocol such as IEEE1394 and IEC958, the AV stream can be fed to the external equipment. This is especially advantageous when a program of a new AV format is outputted through the digital interface 1704 to be played in the external AV equipment, without using the decoders in this player.

On the other hand, to support a new AV format in this player, a new decoder 1709 adapting to the new AV format may be coupled to the track buffer 1703 in the same way as the other existing decoders 1705–1708.

(Recording Operation by DVD Recorder)

Figure 19:
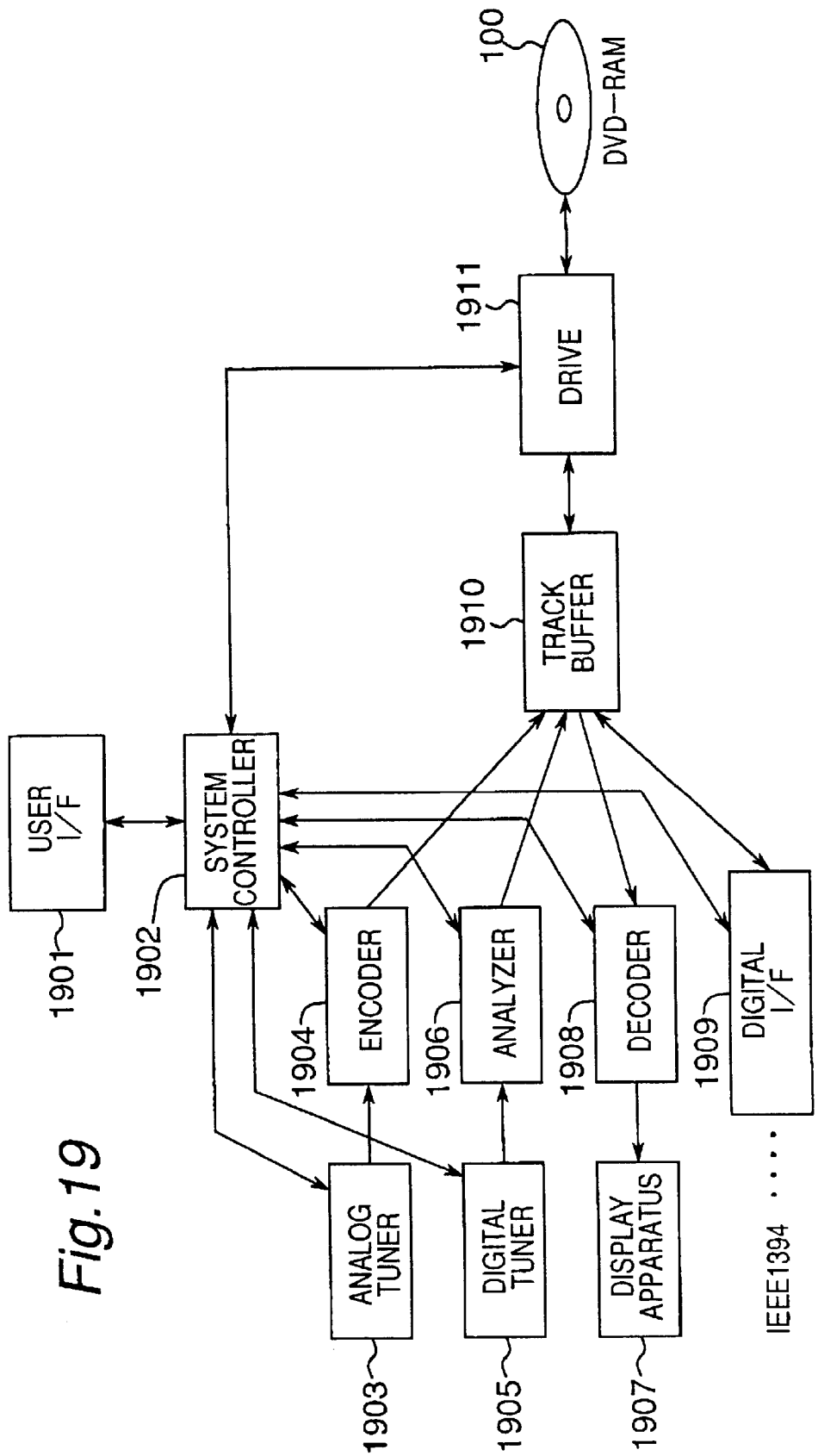
FIG. 19 is a block diagram of the DVD recorder according to the present invention.

Next, reference is made to FIG. 19 to describe structure and operation of a DVD recorder according to the present invention for playing (reproducing)/recording the above optical disc.

As shown in the figure, the DVD recorder comprises a user interface 1901, a system controller 1902, an analog tuner 1903, an encoder 1904, a digital tuner 1905, an analyzer 1906, a display apparatus 1907, and a decoder 1908. The user interface 1901 provides a display for the user and receives requests from the user. The system controller 1902 manages and controls overall of the DVD recorder. The analog tuner 1903 receives VHF and UHF waves. The encoder 1904 converts analog signals into digital signals to encode the digital signal into an MPEG program stream. The digital tuner 1905 receives satellite digital broadcasting. The analyzer 1906 analyzes an MPEG transport stream sent from the digital broadcast satellite. The display apparatus 1907 includes a TV monitor and speaker system. The decoder 1908 decodes the AV streams. The decoder 1908 includes decoders shown in FIG. 18. The DVD recorder further comprises a digital interface 1909, a track buffer 1910 for temporary storage of the data to be written, and a drive 1911 for writing data on the DVD-RAM 100. The digital interface 1909 is an interface for outputting to external equipment through such a protocol as IEEE1394.

In the DVD recorder having the above configuration, the user interface portion 1901 first receives demand from the user. The user interface 1901 transmits a request from the user to the system controller 1902. The system controller 1902 interprets the request into commands to send to appropriate modules. When the request from the user is to record an analog broadcasting program, the system controller 1902 requests the tuner 1903 to receive the program, and the encoder 1904 to encode.

The encoder 1904 performs video encoding, audio encoding and system encoding on the AV data received from the analog tuner 1903 to output the encoded data to the track buffer 1910.

The encoder 1904, upon commencing the encoding operation, sends the playback start time (M_VOB_V_S_PTM) of the MPEG program stream encoded to the system controller 1902, and then in parallel with the encoding operation, sends the time length and size information of the movie object unit (VOBU) to the system controller 1902 as source information for creating the T map.

Next, the system controller 1902 issues a recording request to the drive 1911, so that the drive 1911 takes data stored in the track buffer 1910 and records this information on the DVD-RAM disc 100. At that time, the system controller 1902 instructs the drive 1911 where to store the information on the disc 100 according to the allocation information of the file system.

Ending of the recording operation is demanded by the user through a stop request. The stop request from the user is transmitted through the user interface 1901 to the system controller 1902. The system controller 1902 then issues the stop request to the analog tuner 1903 and the encoder 1904.

Upon reception of the stop request from the system controller 1902, the encoder stops the encoding operation, and sends the playback stop time (M_VOB_V_E_PTM) of the last encoded MPEG program stream to the system controller 1902.

After the encoding operation is over, the system controller 1902 creates the movie object information (M_VOBI) based on the information received from the encoder 1904. Next, the system controller 1902 creates the cell information corresponding to the movie objet information (M_VOBI). The important point here is that the type information in the cell information must be specified as "M_VOB". As described earlier, the information in the cell information is configured without depending on the movie object (M_VOB), and all information which depends on the movie object (M_VOB) is concealed into the movie object information (M_VOBI). Therefore, an error in recognizing the type information in the cell information will lead to inability to perform normal playback, possibly resulting in system down.

Finally, the system controller 1902 requests the drive 1911 to finish recording the data stored in the track buffer 1910, and to record the movie object information (M_VOBI) and cell information. The drive 1911 records the data remaining in the track buffer 1910, the movie object information (M_VOBI) and the cell information on the DVD-RAM, subsequently completing the recording operation.

Next, description will be made in a case of the user's request for recording a digital broadcast program.

The user's request for recording the digital broadcasting program is transmitted through the user interface 1901 to the system controller 1902. The system controller 1902 then requests the digital tuner 1905 to record, and the analyzer 1906 to analyze received data.

An MPEG transport stream sent from the digital tuner 1905 is sent through the analyzer 1906 to the track buffer 1910. The analyzer 1906 first picks up from the MPEG transport stream the start time information (D_VOB_V_S_PTM) as information necessary for generating the digital broadcasting object information (D_VOBI), and sends this information to the system controller 1902. Next, the analyzer 1906 determines the movie object unit (VOBU) in the MPEG transport stream, and sends the time length and size of the movie object unit as information necessary for creating the T map to the system controller 1902. It should be noted that the movie object unit (VOBU) can be determined, as described earlier, based on the random access indicator (random_access_indicator) in the application field contained in the TS packet header.

Next, the system controller 1902 outputs a recording request to the drive 1911. Then the drive 1911 picks up the data stored in the track buffer 1910 and records the data in the DVD-RAM disc 100. At this time, the system controller 1902 also informs the drive 1911 where the arrive 1911 should record the information on the disc 100, based on allocation information of the file system.

Ending of the recording operation is instructed by the user through a stop request. The stop request from the user is transmitted through the user interface 1901 to the system controller 1902. The system controller 1902 then issues the stop request to the digital tuner 1905 and the analyzer 1906.

The analyzer 1906, upon reception of the stop request from the system controller 1902, stops the analyzing operation, and sends the display end time (D_VOB_V_E_PTM) of the movie object unit (VOBU) of the last analyzed MPEG transport stream to the system controller 1902.

After the completion of receiving the digital broadcasting, the system controller 1902 creates the digital broadcasting object information D_VOBI) based on the information received from the analyzer 1906, and next, creates the cell information corresponding to the digital broadcasting objet information (D_VOBI), at which time the type information in the cell information is specified as "D_VOB".

Finally, the system controller 1902 requests the drive 1911 to finish recording the data stored in the track buffer 1910, and to record the digital broadcasting object information and cell information. The drive 1911 records the data remaining in the track buffer 1910, the digital broadcasting object information (D_VOBI) and the cell information on the DVD-RAM disc 100, completing the recording operation.

The above description is made on the basis that the user makes request to start and stop recording. When a timer recording function commonly provided in a VTR system is used, the system controller automatically issues recording start and stop commands in stead of user's request, and thus the steps of operation performed by the DVD recorder are essentially the same.

(Playback Operation by DVD Recorder)

Next, playback operation in the DVD recorder will be described.

First, the user interface 1901 receives a request from the user. The user interface 1901 transmits the request to the system controller 1902. The system controller 1902 interprets the user's request to commands to send them to appropriate modules. For example, when the use's request demands playback of a PGC information, the system controller 1902 analyzes the PGC information and cell information to see which object should be played. Description will be made below for a case in which an original PGC comprising one movie object (M_VOB) and one cell information is played.

The system controller 1902 first analyzes the type information stored in the cell information in the PGC information. When the type information is "M_VOB", it means that the AV stream to be played is the stream recorded as the MPEG program stream. Next, the system controller 1902 refers to the ID of the cell information to find the corresponding movie object information M_VOBI) from the table (M_AVFIT). The system controller 1902 then finds start address and end address of the AV data to be played according to the start time information (M_VOB_V_S_PTM) and end time information (M_VOB_V_E_PTM) contained in the movie object information, and T map.

Next, the system controller 1902 sends to the drive 1911 a request for reading from DVD-RAM 100 together with the start address of the reading. The drive 1911 then reads out AV data from the address given by the system controller 1902, and stores the read data to the track buffer 1910.

Next, the system controller 1902 sends to the decoder 1908 a decoding request of the MPEG program stream. The decoder 1908 then read out the AV data stored in the track buffer 1910 to decode the read data. The decoded AV data is outputted through the display apparatus 1907.

On the completion of reading all the data instructed by the system controller 1902, the drive 1911 reports to the system controller 1902 that the reading operation is completed. The system controller 1902 then issues a command to the decoder 1908 to stop the playback operation. The decoder 1908 continues to decode data until the track buffer 1910 is emptied. After all the data is decoded and played, the decoder 1908 reports to the system controller 1902 that the replay operation is finished, then bringing the playback operation to a complete end.

The above description was made for the case in which one original PGC containing one movie object (M_VOB) and one cell information is to be played. However, the playback operation of the AV stream can be performed by the same steps of operation whether the original PGC contains only one digital broadcasting object D_VOB), contains a plurality of movie objects, contains a plurality of digital broadcasting objects, or contains both movie objects and digital broadcasting object. Further, the same goes with a case in which the original PGC contains a plurality of cells, or in a case of the user-defined PGC.

Further, the audio object (AOB) and other AV stream, i.e. the still picture object (S_VOBS) are handled essentially in the same procedures by the same modules, differing only in the configuration within the decoder 1908. In these cases, the decoder 1908 may be configured by the PS decoder 1705, the TS decoder 1706, the audio decoder 1707, or the still picture decoder 1708 as shown in FIG. 18.

Next, an example is taken for a case in which the decoder 1908 does not have capabilities for playing all kinds of the AV streams.

If the decoder 1908 does not have playback capability for the MPEG transport stream, playback operation by the decoder 1908 is impossible as described above. In such a case the digital interface portion 1909 is used to supply external equipment with the data, so that the data can be played by the external equipment.

When the system controller 1902 finds from the cell information in the PGC information that the user requests playback of a digital broadcasting object D_VOB) not supported by the system, the system controller 1902 requests the digital interface 1909 for external output instead of requesting the decoder 1908 for playback. The digital interface 1909 transmits AV data stored in the track buffer 1910 in accordance with the communication protocol of the connected digital interface. Other operations performed are the same as those performed when the movie object (M_VOB) is played.

A judgment must be made whether or not the decoder 1908 is compatible with the AV stream requested for replay. This judgment may be made by the system controller 1902 by itself, or the system controller 1902 may ask the decoder 1908.

(DVD Player)

Figure 20:
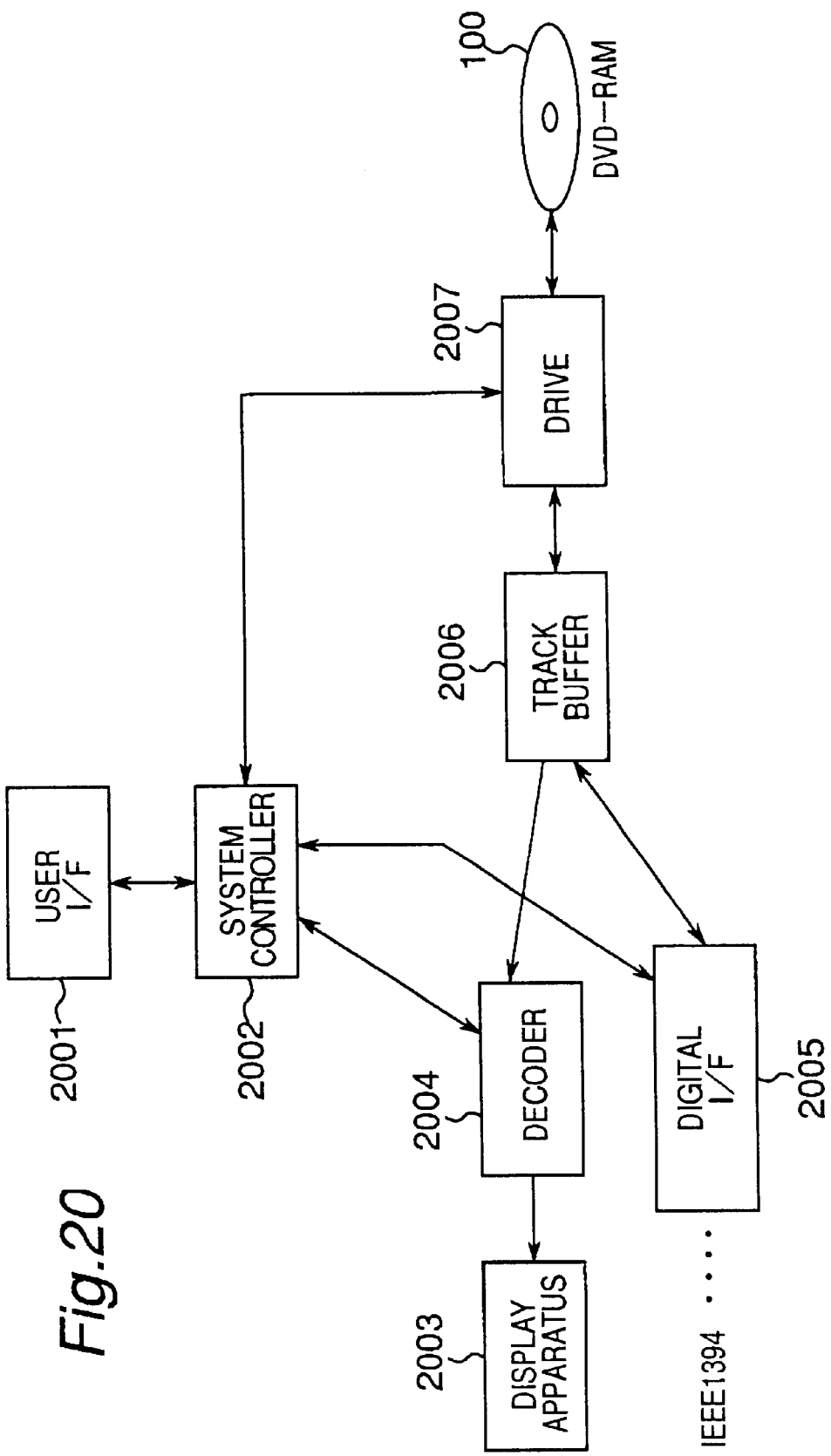
FIG. 20 is a Block diagram of a DVD player or a data reproducing apparatus according to the present invention.

Next, with reference to FIG. 20, a DVD player according to the present invention is described. The DVD player is a realization of the player model described above to play the above optical disc.

As shown in the figure, the DVD player comprises a user interface 2001, a system controller 2002, a display apparatus 2003, a decoder 2004, a digital interface 2005, a track buffer 2006 and a drive 2007. The user interface 2001 receives requests from the user and displays some indications to the user. The system controller 2002 manages and controls overall of the DVD player. The display apparatus 2003 includes a TV monitor and speaker system. The decoder 2004 decodes the MPEG stream. The digital interface 2005 connects to IEEE1394 and so on. The track buffer 2006 temporally stores the data read from the DVD-RAM 100. The drive 2007 reads data out from the DVD-RAM 100. The DVD player configured as above performs the same playback operations as in the DVD recorder described earlier.

It should be noted that the DVD-RAM is taken as an example in the present embodiment. However, the same description so far has been made applies to other media. The present invention should not be limited to such media as the DVD-RAM and other optical discs.

Further, according to the present embodiment, the AV stream not supported by the decoder is played through the digital interface. However, those AV streams which are supported by the decoder may be outputted to external equipment through the digital interface depending on the request from the user.

Further, according to the present embodiment, the audio data and the still picture data were treated as unique data differing from the MPEG streams. However, these data may also be recorded in the format of MPEG system stream.

Second Embodiment

A second embodiment of the present invention will be described below by using a DVD recorder and a DVD-RAM as examples.

Since the basic structures and operations of the DVD recorder and the DVD-RAM according to the present embodiment are the same as those in the first embodiment, their description is omitted. In the following, particularly, description will be given to the structure of an access map for a digital broadcasting object (D_VOB) which is an object for a digital broadcast.

(PCR map and PTS map)

Figure 21:
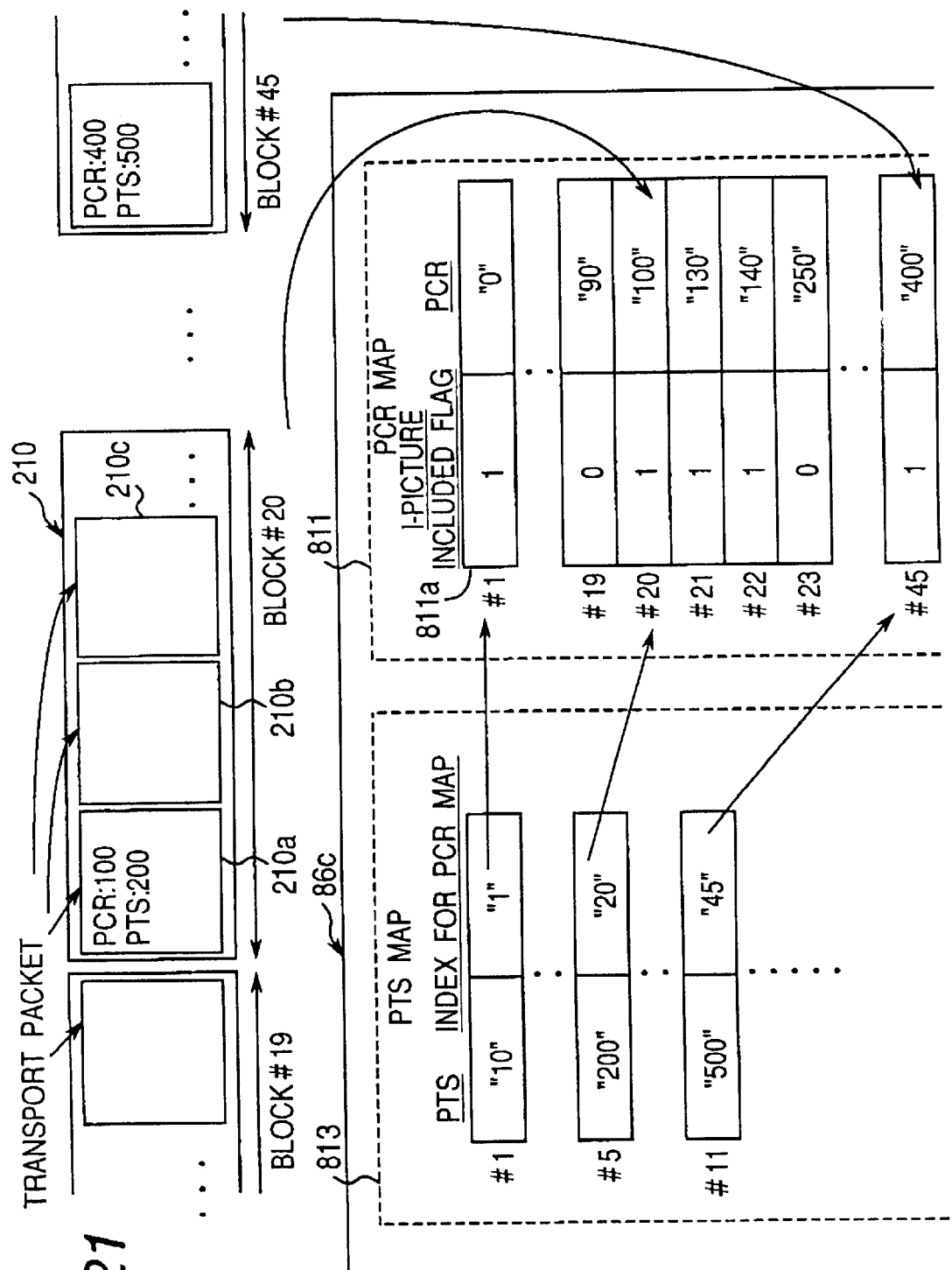
FIG. 21 is a diagram showing the basic structure of an access map for a digital broadcasting object (D_VOB).

FIG. 21 shows the details of the access map according to the present embodiment. As shown in FIG. 21, an access map 86c is made of a two-hierarchy comprising a PCR map 811 and a PTS map 813.

When the digital broadcasting object (D_VOB; is to be recorded on a disc, a stream is recorded for each ECC block as a recording unit. More specifically, the stream recording is always started at a head sector in the ECC block.

The access map manages an object in a block unit collecting a predetermined number (N) of ECC blocks. In the following, a group of N blocks acting as the management unit of the access map will be simply referred to as a "block". N is an integer of 1 or more and is fixed in the stream. One block includes a plurality of transport packets. In an example shown in FIG. 21, a 20th block 210 includes a plurality of transport packets 210a, 210b, 210c . . . .

The PCR map 811 is a table having an entry corresponding to a block, and, therefore, has the same number of entries as the blocks. The PCR map 811 manages, for each entry, a PCR (Program Clock Reference) given to the transport packet provided on the head of a block indicated by the entry, and an I-picture included flag 811a for the block. The PCR is information indicative of a time for input of the data to a decoder. The I-picture included flag serves to identify that the data of the I-picture (self-reproduceable picture) of MPEG video data are stored or not in the block. In the present embodiment, the I-picture included flag of "1"

indicates that the block includes the I-picture. In the example shown in FIG. 21, a value ("100") of the PCR given to the transport packet 210a on the head of the 20th block 210 are stored in the 20th entry of the PCR map 811, as well as the I-picture included flag ("1") for the 20th block 210.

The PTS map 813 is a table for managing the value of PTS (Presentation Time Stamp) for each I-picture in the digital broadcasting objet (D_VOB). The PTS map 813 is comprised of the PTS value for each I-picture and an index indicative of a block number in which the I-picture is included. In the case where the I-picture is included in a plurality of blocks, only a number of a head block of them in which the I-picture is included is stored as the index. In FIG. 21, it is apparent from the PCR map 811 that the I-picture is stored from the 20th to 22nd blocks. In this case, the fifth entry of the PTS map 813 stores the head block number of "20" of a block group including the I-picture as the index for the PCR map together with a PTS value ("200") in the head block.

As shown in FIG. 21, the PCR map 811 is a table having an entry for each block and the order of the entry in the PCR map 811 corresponds to a block number indicated by the entry. For this reason, the block number corresponding to the PTS value is designated by using the order of the PCR entry in the PCR map 811 in the index for the PCR map of the PTS map 813.

(Reproduction using PCR map/PTS map)

Figure 22:
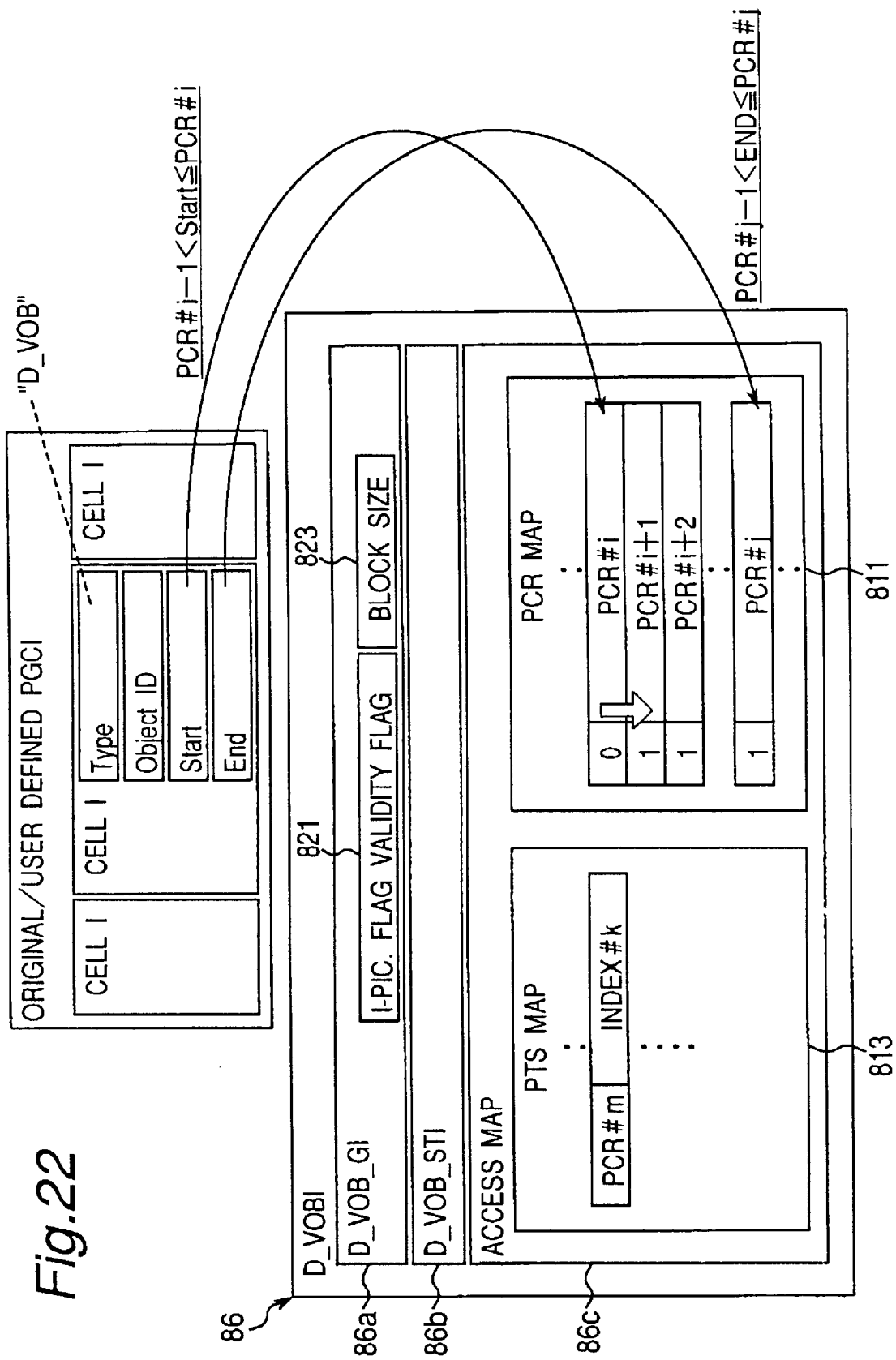
FIG. 22 is a diagram showing a relationship between cell information and the access map during the reproduction of the digital broadcasting object.

Referring to FIG. 22, next, description will be given to a method for reproducing a digital broadcasting object from PGC information using the PCR map 811 and the PTS map 813.

First of all, the structure of D_VOBI will be described. The basic structure of the D_VOBI is the same as in the first embodiment. Therefore, the differences between the present embodiment and the first embodiment will be described below.

In FIG. 22, digital broadcasting object general information (D_VOB_GI) 86a has an I-picture flag validity flag 821 and block size information ("Block size") 823. The I-picture flag validity flag 821 indicates the validity of the I-picture included flag in each PCR entry described above.

The block size information 823 indicates the size of the block comprising the number N of ECCs described above.

Thus, the I-picture flag validity flag 821 for identifying the validity of the I-picture included flag is provided for the following reason. When a transport stream cannot be analyzed and is recorded without identification of I-pictures, the validity of the I-picture included flag should be previously decided in order not to erroneously recognize the I-picture included flag during the reproducing operation.

Next, the procedure for reproducing the digital broadcasting object will be described.

The structures of PGC information (PGCI) and cell information (CeIII) are the same as those in the first embodiment. Start position information (Start) and end position information (End) of the digital broadcasting object which are stored in the cell information indicate the value of a PCR in the transport stream.

In the case where the digital broadcasting object is to be reproduced, a position at which the digital broadcasting object is to be read out is determined based on the start position information (Start) stored in the cell information in the following manner. When the cell information is stored in user-defined PGC information, the start position information indicates a start time which is optionally designated by a user and the reading is performed with a random access.

First of all, the time stored in the start position information (Start) is compared with each PCR value stored in the PCR map 811, thereby detecting an ith entry in the PCR map which satisfies the following condition.

$$PCR\#i-1 \leq Start \leq PCR\#i \quad (1)$$

"PCR #x" provided herein represents a PCR of the xth entry. "entry #x" represents the xth entry in the following. As described above, moreover, referring to the PCR value to obtain the entry of the map corresponding to the start position information (Start) is also referred to as "mapping".

Next, the I-picture flag validity flag 821 of the digital broadcasting object information (D_VOB_GI) is checked. When the flag 821 indicates "valid", the I-picture included flag of the entry #i of the PCR is checked. When the block does not include the I-picture (that is, the value of the flag is "0"), the next PCR entry, that is, a PCR entry #i+1 is checked in the same manner. Subsequently, the search is continued in a backward direction (a proceeding direction) until the head block including the I-picture is found.

When the I-picture included flag of the PCR entry #i which has been first checked indicates that the block includes the I-picture (that is, the value of the flag is "1"), the search is continued in a direction toward a PCR entry #i−1 which is the PCR entry, that is, a forward direction (a reverse direction) until the PCR entry of the head of the. I-picture is found. A block indicated by the PCR entry retrieved in the above-mentioned manner acts as a reproducing start block.

Next, a time designated by the end position information (End) in the cell information is compared with each PCR value stored in the PCR map 811, thereby detecting an entry #j of the PCR map which satisfies the following condition. Consequently, the reproducing end block can be specified.

$$PCR\#j-1 \leq End \leq PCR\#j \quad (2)$$

The reproducing start block and the reproducing end block which are obtained in the above-mentioned manner are converted into address information of the digital broadcasting object D_VOB by using the block size information 823 of the general information of the digital broadcasting object (D_VOB_GI), and, furthermore, are converted into address information in a file in which the digital broadcasting object is stored. Then, data is read out from the file by using the address information to be decoded and reproduced.

In the PTS map 813, moreover, an entry indicative of the reproducing start block obtained by the PCR map 811 is retrieved by relating the entry of the PCR map 811 to that of the PTS map 813 through an index. By giving, as a display start time, the PTS value obtained by the retrieval in the PTS map 813 to the decoder, the decoder can control an input stream such that the data is not displayed before the time indicated by the PTS.

As described above, random access reproduction for the recorded digital broadcasting object can be performed in an optical disc according to the present embodiment.

(Special Reproducing Operation)

Next, a process for special reproduction, that is, rapid feeding reproduction will be described with reference to FIG. 23.

The special reproduction is performed by referring to the above-mentioned I-picture included flag. The I-picture has a maximum size of 224 KB. Therefore, the I-picture is generally divided into a plurality of blocks to be recorded. Accordingly, a PCR entry continuously having a value of the I-picture included flag of ON (that is, "1") is set to one unit and the special reproduction is performed for each unit.

Figure 23:
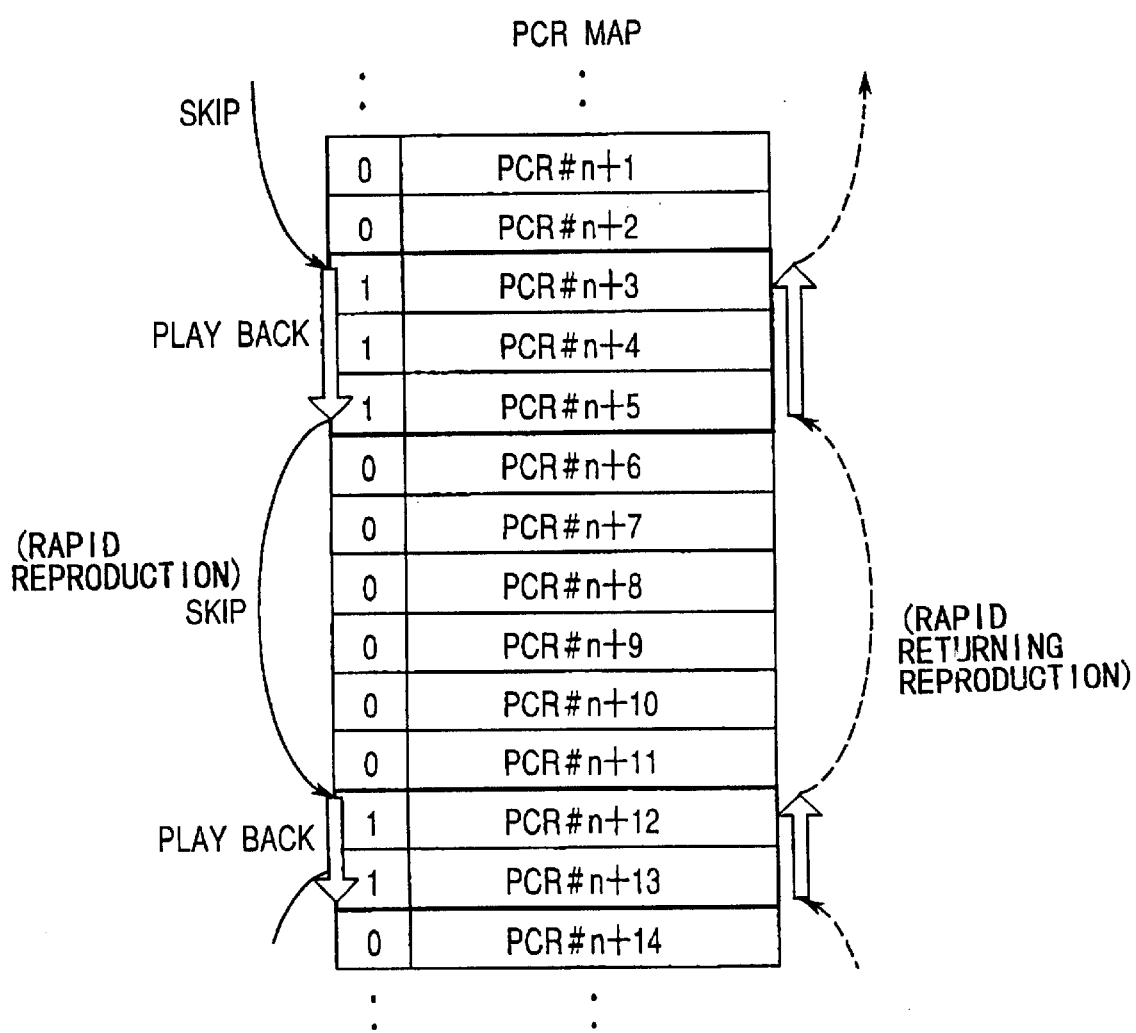
FIG. 23 is a diagram showing a method for using the access map during the special reproduction of the digital broadcasting object.

As shown in FIG. 23, for example, it is assumed that the I-picture included flag is set for each PCR entry. In this case, a PCR entry #n+3 to a PCR entry #n+5 in which the I-picture included flag is continuously ON are set to a reproduction unit of the I-picture and data corresponding to these entries are read out from the file in order to be decoded and reproduced. When each of the blocks corresponding to the PCR entries #n+3 to #n+5 is completely read out, the process skips to an entry #n+12 in which the I-picture included flag is ON in order to perform the reproduction of the next I-picture. By repeating the above-mentioned process, the special reproduction, that is, the rapid feeding reproduction can be performed. Moreover, rapid returning reproduction can be performed by skipping the reproduction unit of the I-picture in a reverse direction.

(Erasing Operation)

Next, an erasing operation will be described with reference to FIG. 24.

A method for detecting an erasing section is basically the same as the process for reproduction. More specifically, PCR entries corresponding to a start position and an end position which are designated by a user are obtained, and the I-picture included flag of the entry at an erasing start position is checked. It should be noted that a block including the head of the I-picture is not an erasing start block but a block just after the block is the erasing start block.

The reason is as follows. The last data of a previous GOP (Group of Pictures) are also stored together in the block including the head of the I-picture. Therefore, if the block including the head of the I-picture is erased, the GOP just before cannot normally be reproduced to the end.

For the erasing operation, moreover, the same process as in a start block is carried out for an erasing end block. In FIG. 24, when the I-picture included flag of the entry #n−1 which is the erasing end position designated by the user is ON, a retrieval is further carried out until an entry of which the I-picture included flag is ON is retrieved in a proceeding direction, that is, a next entry direction. When the entry with the I-picture included flag of "ON" is detected, a block indicated by an entry just before the detected entry is set to the erasing end block. In the example of FIG. 24, the PCR entry with the first I-picture included flag of ON after the entry #n−1 is the entry #n+1. Therefore, a block corresponding to the PCR entry #n just before the entry #n+1 is set to the erasing end block. More specifically, each of the blocks corresponding to the PCR entries from #1 to #n is erased.

Conversely, in the case where the I-picture included flag of the entry #n−1 designated by the user as the erasing end position is ON, the retrieval is carried out in a reverse direction to detect a PCR entry with the I-picture included flag of OFF. When the first PCR entry with the I-picture included flag of OFF is found, the block corresponding to the found PCR entry is set to the erasing end block.

After the above-mentioned process, the data from the erasing start block to the erasing end block are erased and the PCR entries corresponding to these blocks in the PCR map 811 are erased.

Figure 24:
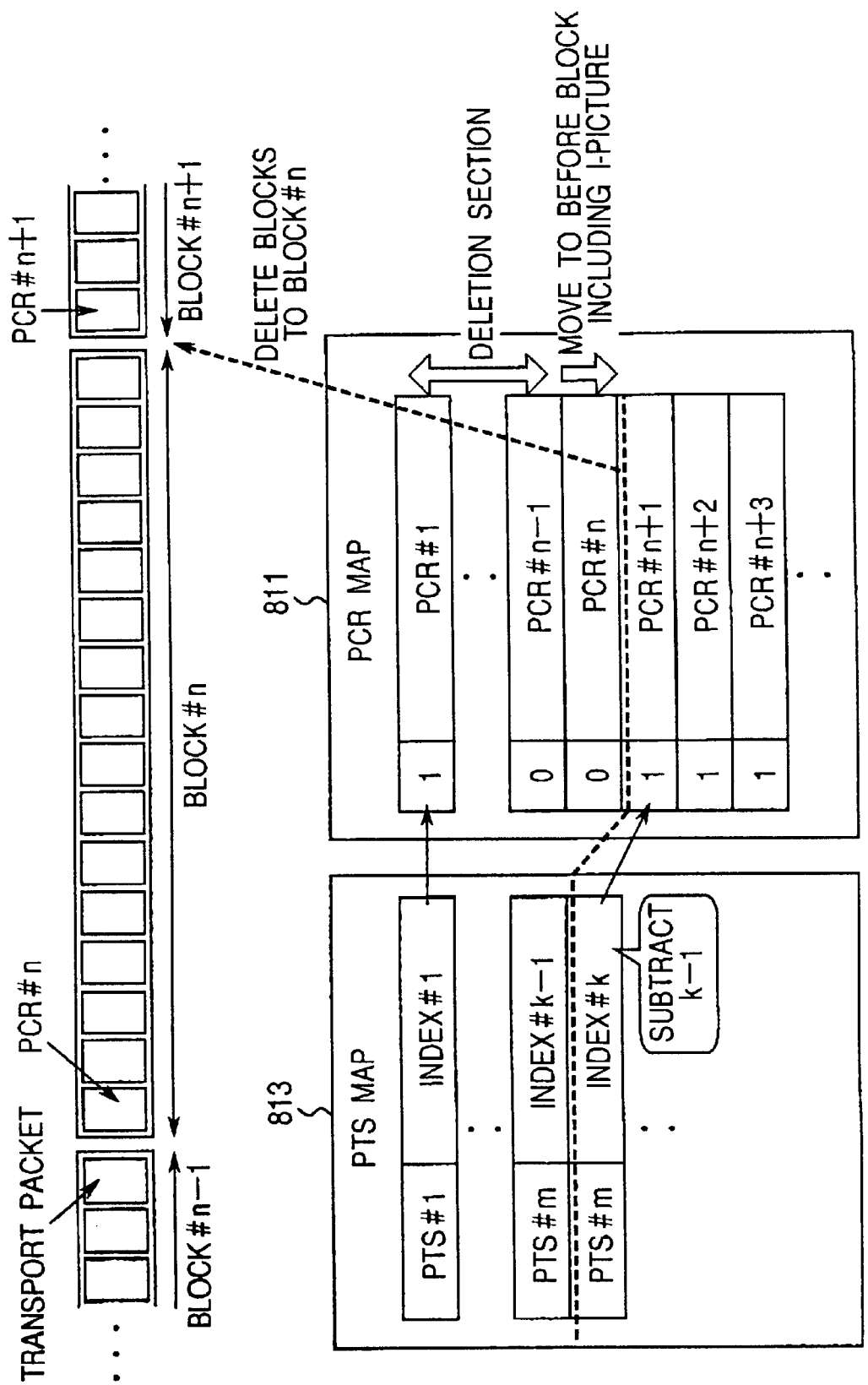
FIG. 24 is a diagram showing a relationship between a stream and the access map during the erasure of the digital broadcasting object.

As shown in FIG. 24, moreover, the PTS entry of the PTS map 813 indicative of the PCR entry erased in the PCR map is also erased, and index numbers in the remaining PTS entries are subtracted by the number of the PTS entries erased in the forward portion respectively.

In the case where only the intermediate portion of the digital broadcasting object (D_VOB) is to be erased, that is, the erasing is performed leaving front portion and rear portion of the digital broadcasting object, the entry of an erasing section is erased for the PCR and PTS maps corresponding to the digital broadcasting object remaining in the front portion. The index number of the PTS entry is modified in addition to the erasure of the entry corresponding to the erased block as described above for the PCR and PTS maps corresponding to the digital broadcasting object remaining in the rear portion.

(Multistream)

Figure 25:
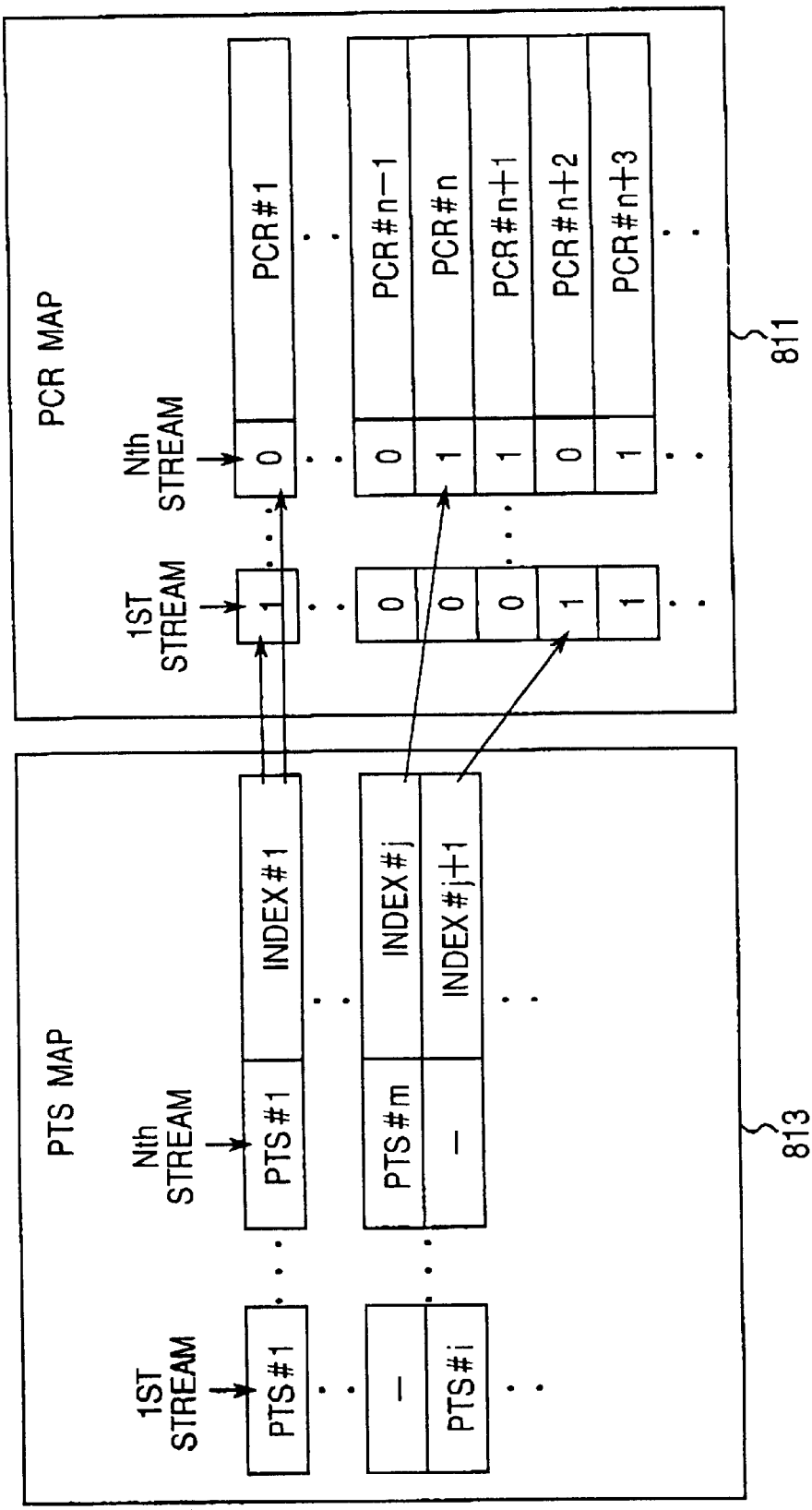
FIG. 25 is a diagram showing the multistream correspondence of the access map.

Next, the case of a multistream will be described with reference to FIG. 25.

It is possible to simultaneously multiplex a plurality of video streams to the transport stream of an MPEG. In the case where there are N video streams, the number of video streams (Number_of_Streams) 831 is described in the general information of the digital broadcasting object (D_VOB_GI) as shown in FIG. 25, for example.

In the PCR map 811, moreover, the field of the I-picture included flag in the PCR entry is extended corresponding to the N streams, respectively. Also in the PTS map 813, similarly, the PTS field of the I-picture in the PTS entry is extended for the N streams.

(Recorder)

The structure and basic operation of a recorder is almost the same as the structure and basic operation described in the first embodiment.

In the present embodiment, particularly, an analyzing section 1906 serves to create the PCR map and PTS map. In the case where the recorder has no capability of creating the PTS map, that is, of analyzing the video data of the MPEG stream, all the I-picture included flags in the PCR entry are set to 0 and the I-picture flag validity flag in the D_VOB_GI is turned OFF ("invalid").

The details of the process of creating the access map by the analyzing section 1906 will be described below with reference to the flow charts of FIGS. 26 and 27.

Figure 26:
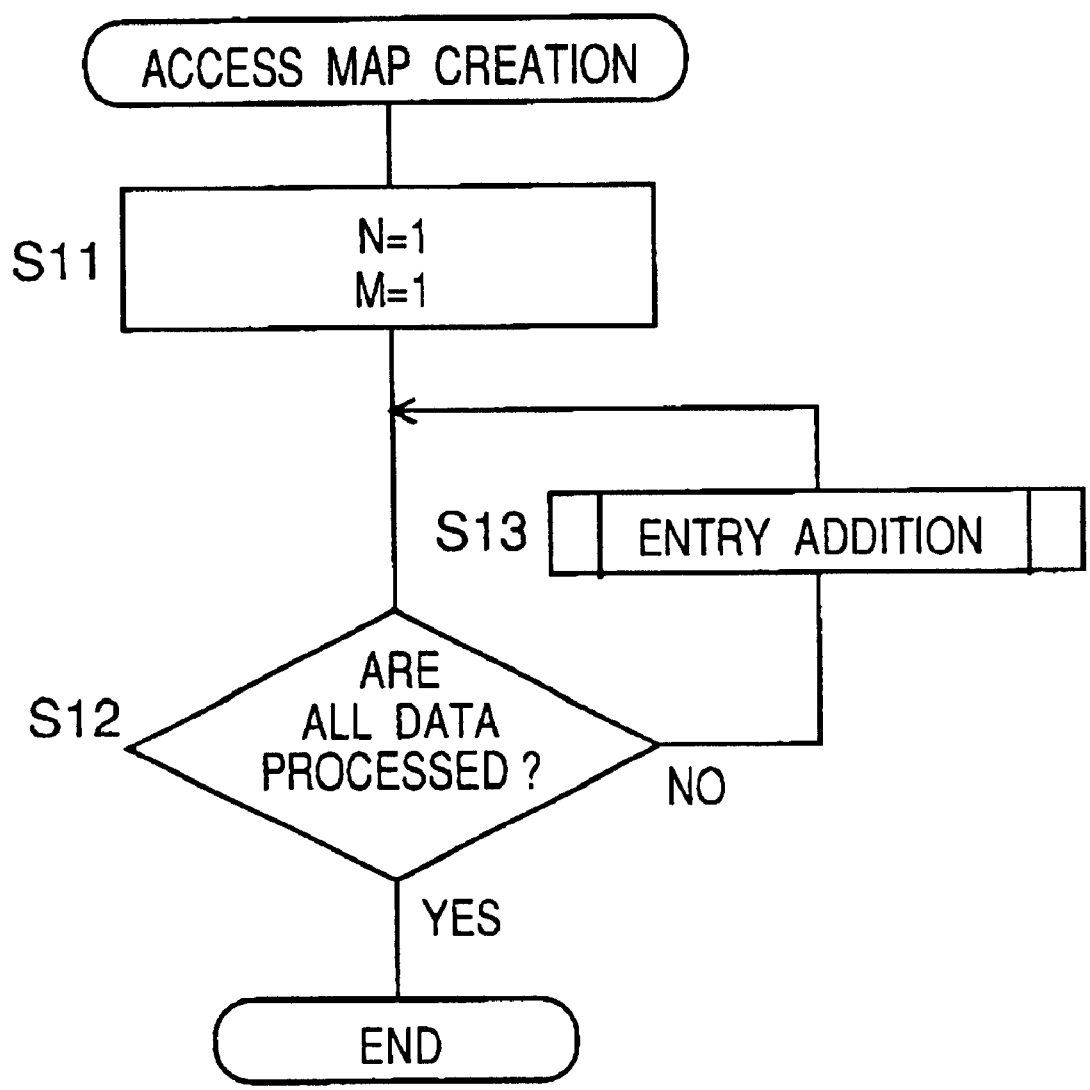
FIG. 26 is a flow chart showing a process of creating the access map.

As shown in FIG. 26, first, a counter M indicative of the additional entry number of the PCR map 811 and a counter N indicative of the additional entry number of the PTS map 813 are set to 1, respectively (S11). Next, it is decided (S12) whether or not the data on all objects which are designated by the cell information in the PGC information are subjected to an entry adding process (S13) which will be described below. The data on all the objects are subjected to the entry adding process (S13).

Figure 27:
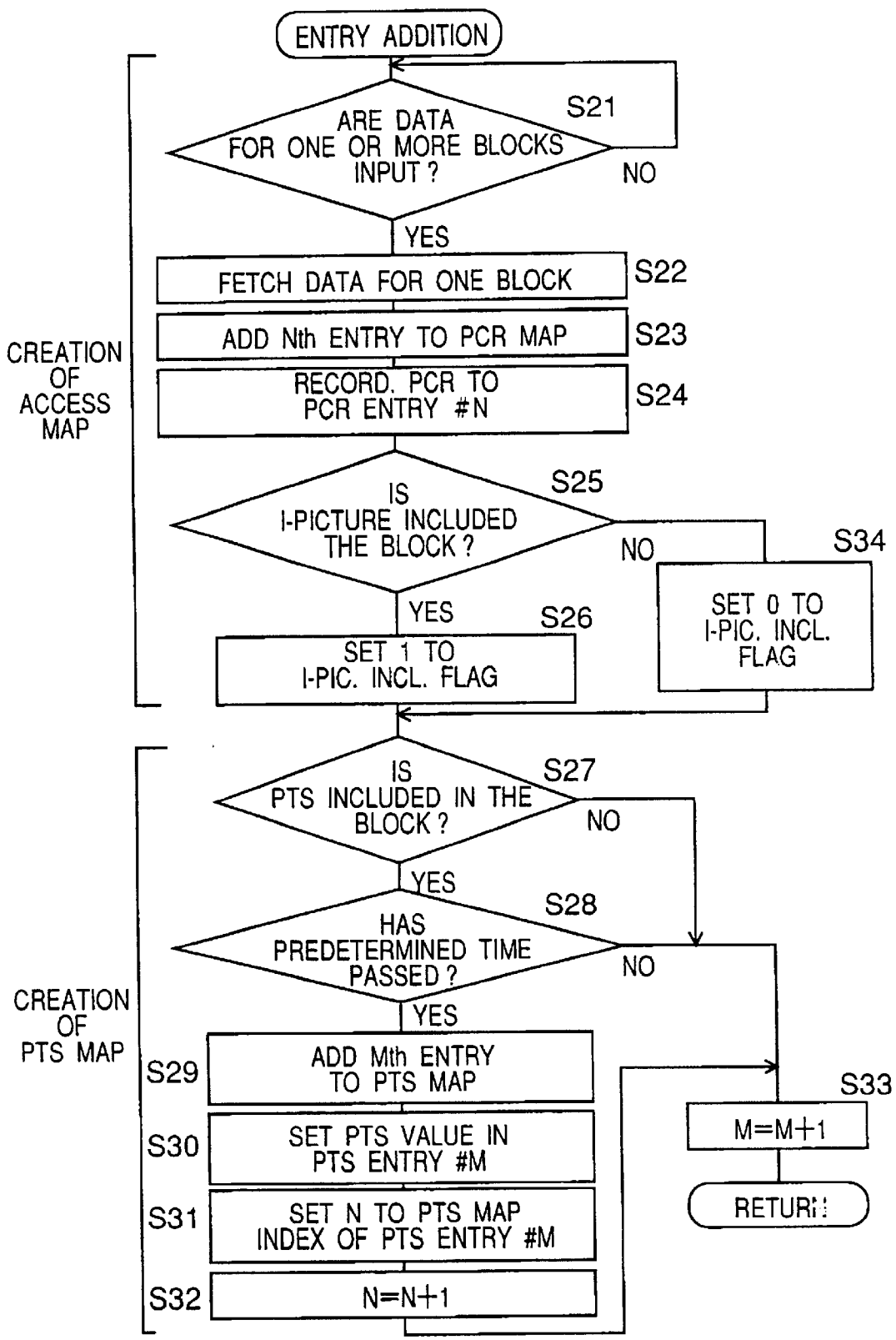
FIG. 27 is a flow chart showing an entry adding process in each of the access maps.

FIG. 27 is the flow chart showing the entry adding process (S13).

In this process, when data for one block or more are input to a track buffer (S21), the data for one block are fetched (S22) and the Nth entry (entry #N) designated by the counter N is added to the PCR map (S23). The PCR value of a head transport packet included in a block corresponding to the PCR entry #N is recorded on the PCR value of the same entry (S24). Then, it is decided whether the I-picture is included in the block or not (S25). When the I-picture is included, the I-picture included flag of the PCR entry #N is set to "1 (ON)" (S26). Otherwise, the flag is set to "0 (OFF)" (S34).

Thereafter, it is decided whether the PTS is included in the block or not (S27). When the PTS is not included, the routine proceeds to Step S33. When the PTS is included in the block, it is decided whether or not a predetermined time or more has passed after the entry of the PTS was previously added (S28). That is, the entry is not added to the PTS map 813 for all the blocks including the PTS, but is added to the map 813 for the block including the PTS such that one PTS is included for each predetermined time. Consequently, the size of the PTS map 813 is limited.

When it is decided that the predetermined time or more has not passed after the entry of the PTS was previously added at Step S28, the routine proceeds to Step S33. When the predetermined time or more has passed after the entry of the PTS was previously added, an entry is newly added to the PTS map 813 (S29). More specifically, the Mth entry (entry #M) indicated by the counter, M is added to the PTS map 813. Then, a PTS value is set to the PTS value of the PTS entry #M (S30), N is set to an index for the PCR map of the PTS entry #M (S31), and the N is incremented (S32). Finally, M is incremented at Step S33. Thus, the present process is ended.

(Player)

The structure and basic operation of a player is also almost the same as the structure and basic operation described in the first embodiment.

In the present embodiment, particularly, a reproducing start block and a reproducing end block are calculated for the reproducing start position information and the reproducing end position information in the cell information by referring to the PCR map and the I-picture included flag as described in the present embodiment.

The details of the reproducing process referring to an access map will be described below with reference to the flow charts of FIGS. 28 and 29. The present process is implemented by a system controller 2002.

Figure 28:
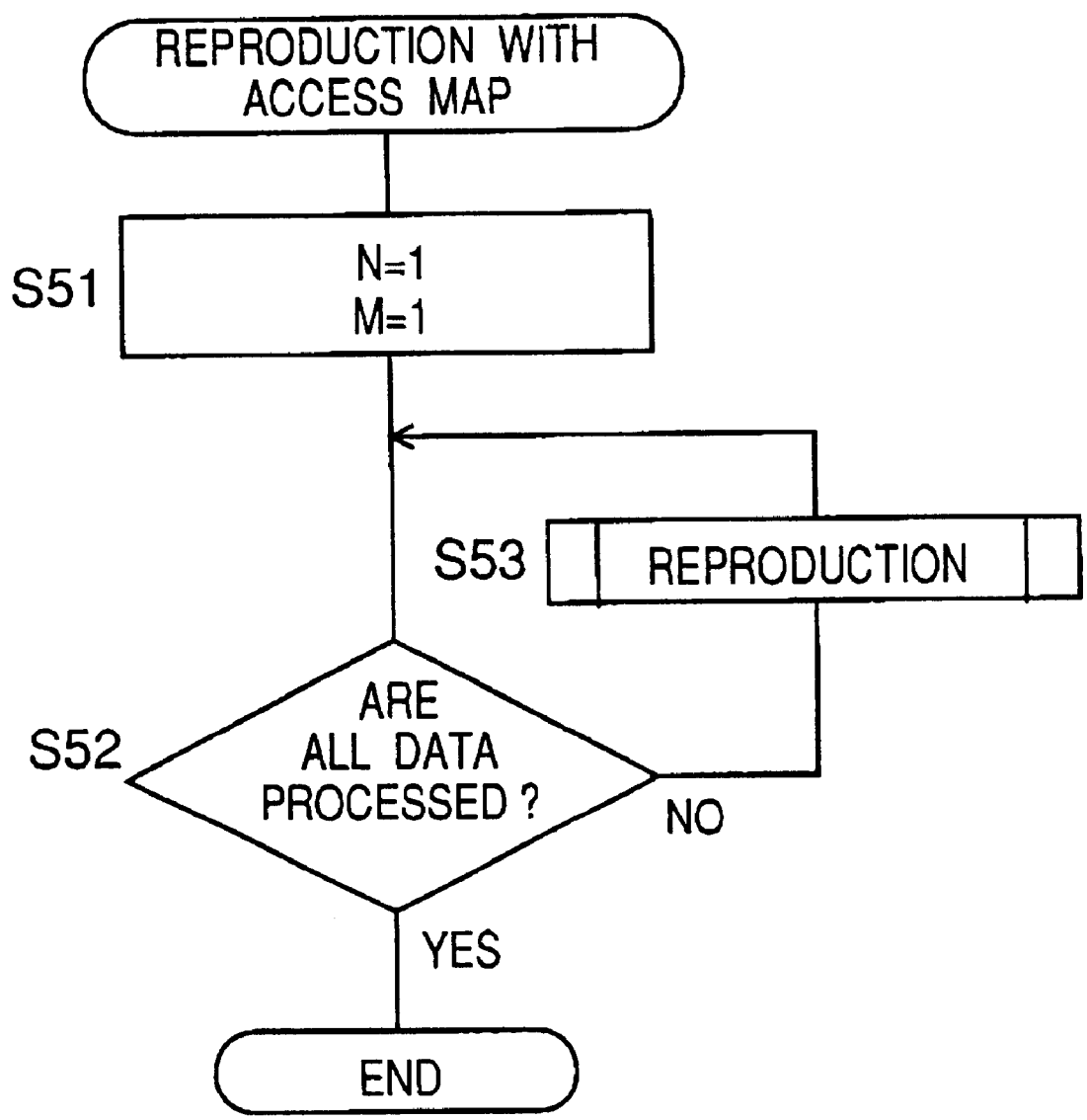
FIG. 28 is a flow chart showing a data reproducing process with reference to the access map.

As shown in FIG. 28, first, the counters M and N are set to 1 (S51). Next, it is decided whether or not the following reproducing process (S53) has been carried out for data on all objects which are designated by the cell information in the PGC information (S52), and the reproducing process (S53) is carried out for the data on all the objects.

Figure 29:
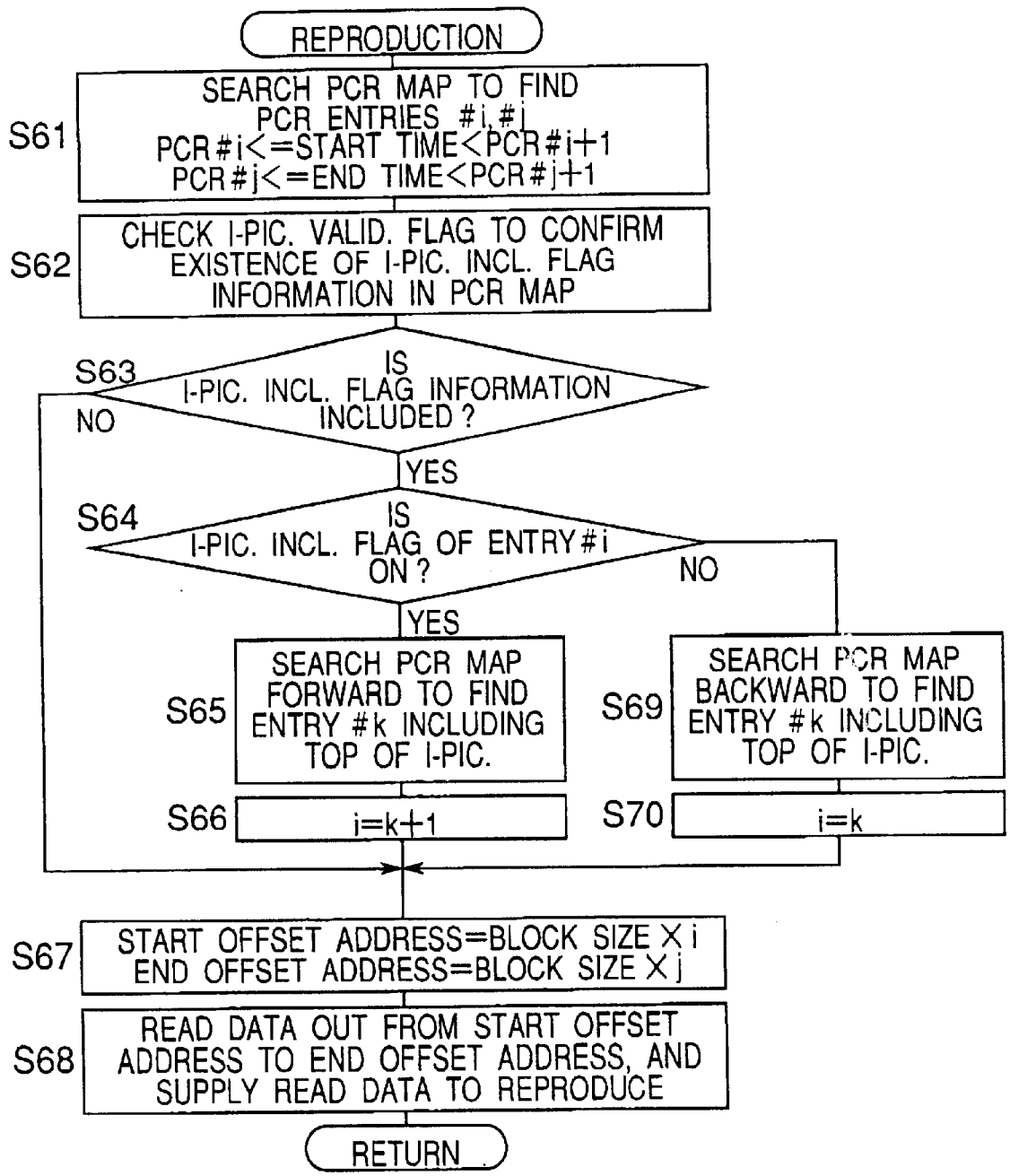
FIG. 29 is a flow chart showing a specific data reproducing process.

FIG. 29 is the flow chart showing the reproducing process (S53). The present reproducing process serves to reproduce the designated object from a designated start time to a designated end time.

First of all, a start time (Start) and an end time (End) which are designated in the cell information are mapped onto the entry of the PCR map 811. Concretely, the. PCR map 811 is searched to calculate PCR entries #i and #j which satisfy the following equations based on the designated start time and end time (S61).

$$\text{PCR}\#i \leq \text{Start} \leq \text{PCR}\#i+1 \quad (3)$$

$$\text{PCR}\#j \leq \text{End} \leq \text{PCR}\#j+1 \quad (4)$$

Next, the I-picture flag validity flag in the general information of the object is checked to ascertain whether the I-picture included flag information is present in the PCR map 811 or not (that is, the I-picture included flag information is valid or not) (S62). As a result, when it is decided that the I-picture included flag information is not present in the PCR map 811 (that is, the I-picture included flag information is invalid) (S63), the routine proceeds to Step S67.

On the other hand, when it is decided that the I-picture included flag information is present in the PCR map 811 (that is, the flag information is valid) (S63), it is decided whether the I-picture included flag of the PCR entry #i is ON or not (S64). When the I-picture included flag of the PCR entry #i is ON, the PCR map 811 is searched forward from the entry #i, thereby finding an entry #k including the head of the I-picture (S65). More specifically, a maximum k is found, which satisfies k≦i and with which the I-picture included flag of the PCR entry #k is OFF. Then, i is calculated with i=k+1 (S66), and the routine proceeds to Step S67.

When the I-picture included flag of the PCR entry #i is not ON (S64), the PCR map is searched backward from the entry #i, thereby obtaining an entry #k including the head of the I-picture (S69). More specifically, a minimum k is obtained, which satisfies k≧i and with which the I-picture included flag of the PCR entry #k is ON. Then, i is obtained with i=k (S70), and the routine proceeds to Step S67.

At Step S67, a start offset address and an end offset address are calculated by the following equations, respectively.

$$\text{Start offset address} = \text{Block size} \times i \quad (5)$$

$$\text{End offset address} = \text{Block size} \times j \quad (6)$$

Then, data are sequentially read out from the file based on the start offset address and the end offset address, and are supplied to a decoder for reproducing (S68).

(Variations)

While the recording of the stream is carried out for each ECC block in the above embodiment, the same advantages can also be obtained for other fixed-length block units, that is, it is not restricted to the ECC block unit. Moreover, while the block unit is fixed in the stream, it may be fixed in an optical disc.

Furthermore, while the value stored in the PCR map is the PCR value of the transport stream, it may be an SCR (System Clock Reference) in a program stream, or it may be a time for input to a system decoder.

Although in the above embodiment, provided is the I-picture included flag for deciding whether the I-picture is included in the block or not, it is also possible to provide a flag (reference picture included flag) comprising a plurality of bits and indicating whether the I-picture and I-picture are included or not.

While the PCR entry #i for each of reproducing and erasing start is calculated by using the equation (1) based on the start position information of the cell information (Celil) when reproducing and erasing data, i may be calculated with approximation by the following equation.

$$\text{PCR}\#i \leq \text{Start} \leq \text{PCR}\#i+1 \quad (7)$$

Moreover, In the above embodiment, the I-picture included flag is checked to detect the reproducing start block during the reproducing operation. When the I-picture is not present in the block, the PCR entry is checked in the backward direction. On the contrary, the PCR entry may be checked in the forward direction, that is, detection may be performed by returning to the head block of the forward I-picture.

Furthermore, the I-picture included flag is checked to detect the reproducing start block during the reproducing operation. If the I-picture is present in the block, the PCR entry is checked in the forward direction to return to the head of the I-picture. On the contrary, the PCR entry may be checked in the backward direction, thereby performing the retrieval to proceed to the head of the next I-picture.

Moreover, in the erasing operation, the I-picture included flag is checked to detect the erasing start block. When the I-picture is not included in the block, the PCR entry is checked in the forward direction, thereby detecting the erasing start block. On the contrary, the PCR entry may be checked in the backward direction to detect the erasing start block.

Furthermore, in the erasing operation, the I-picture included flag is checked to detect the erasing start block. When the I-picture is included in the block, the PCR entry is checked in the backward direction, thereby detecting the erasing start block. On the contrary, the PCR entry may be checked in the forward direction to detect the erasing start block.

While the block number "j" of the reproducing end block or the erasing end block is calculated by using the equation (2) based on the end position information of the cell information during the reproducing operation and the erasing operation, it may be calculated in a reverse direction by the following equation.

$$PCR\#j \leq End \leq PCR\#j+1 \qquad (8)$$

Moreover, during the reproducing operation, in the case where the reproducing end block determined by the reproducing end position designated by the user includes the I-picture, the head block including the same I-picture may be retrieved in the forward or backward direction and the retrieved block may be set to the reproducing end block in the same manner as in the case of the reproducing start block.

In the reproducing operation, furthermore, the reproducing start block or the reproducing end block designated by the user may simply be mapped onto the PCR entry, thereby determining the position of the mapped block as the reproducing start and end positions without taking the position of the I-picture into consideration (that is, without detecting the block including the head of the I-picture).

During the erasing operation, detecting the head of the I-picture determines the erasing start block and the erasing end block. However, without this process, simply mapping the erasing start block and the erasing end block designated by the user onto the adjacent block may determine the start and end positions of a block group to be actually erased.

When the N multistreams are to be stored, although the PTS map and the PCR map is extended to have N fields, M (M≧N) fields may previously be prepared to use N fields during the recording operation. At this time, N is recorded for the number of streams (Number_of_Streams) in the general information (D_VOB_GI) of the digital broadcasting object.

Although the I-picture included flag is provided for each PCR entry in the present invention, it is also possible to set, in place of the I-picture included flag, a flag indicating that each PCR entry is the head of the I-picture or not, a flag indicating that the PCR entry is the end of the I-picture or information indicative of the size of the I-picture, thereby specifying the reproducing or erasing start block by using these flags and information in the same manner as described above.

While the present invention has described the optical disc, the optical disc recorder and the optical disc player, for example, the same advantages can be obtained even if the MPEG transport stream is to be recorded on other media such as a hard disc and the like, and the present invention is not essentially restricted to physical media.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. An recording medium for recording at least one of video data, comprising:

video data area storing the video data which includes a plurality of pictures each picture being encoded by one of an inter-picture encoding method and an inter-picture encoding method; and map information area storing the map information which manages video data for each block, having a fixed data length, the map information including an address information which indicates an address of the block including the picture to be reproduced with each reproduction time and a first map which has flag information indicating whether each block includes at least a part of the intra-picture or not.

2. The recording medium according to claim 1, wherein said fixed data length is equal to a block length of an ECC block.

3. The recording medium according to claim 1, wherein the first map further comprises decoder input time information of video data for each block.

4. The recording medium according to claim 1, wherein the map information further comprises a second map for relating reproducing time information of intra-picture to a block number of the block including a head of the intra-picture.

5. The recording medium according to claim 1, wherein the management information stores information indicative of validity of the flag in the first map.

6. The recording medium according to claim 1, wherein the management information has information about a size of the block.

7. The recording medium according to claim 1, wherein the flag information indicates that each block includes at least of a part of I-picture data in MPEG method or not.

8. The recording medium according to claim 7, wherein the flag information further indicates that each block includes at least of a part of P-picture data in MPEG method or not.

9. The recording medium according to claim 1, wherein the address of the block including the picture to be reproduced corresponds to the block number of the block in the first map.

10. An apparatus for recording information on the recording medium according to claim 1, comprising:

a unit for recording decoder input time information of a block on the first map correspondingly to a block number of the block;

a unit for deciding whether or not the block includes at least a part of the intra-picture; and a unit for setting the flag for the block based on the decision and for recording the flag correspondingly to the block number.

11. The information recording apparatus according to claim 10, further comprising:

a unit for deciding whether or not a block stores reproducing time information of video data; and a unit for recording the reproducing time information on the second map correspondingly to a block number of the block when the block stores the reproducing time information.

12. An apparatus for reproducing information from the recording medium according to claim 1, comprising:

a unit for finding entries of the first map corresponding to reproducing start and end positions designated by a user, respectively, with reference to decoder input time information in the first map;

a unit for calculating addresses to specify the reproducing start position and the reproducing end position from the found entries, respectively; and a unit for reading video data from the information recording medium based on the calculated addresses to reproduce the read video data.

13. A method for recording information on the recording medium according to claim 1, comprising:

recording decoder input time information of a block, correspondingly to a block number of the block, on the first map;

deciding whether or not the block includes at least a part of the intra-picture; and setting the flag for the block based on the decision and for recording the flag correspondingly to the block number.

14. The information recording method according to claim 13, further comprising:

deciding whether or not a block stores reproducing time information of video data; and recording the reproducing time information on the second map correspondingly to a block number of the block when the block stores the reproducing time information.

15. A method for reproducing information from the recording medium according to claim 1, comprising:

finding entries of the first map corresponding to reproducing start and end positions designated by a user with reference to decoder input time information in the first map, respectively;

calculating addresses to specify the reproducing start position and the reproducing end position from the found entries, respectively; and reading video data from the information recording medium based on the calculated addresses to reproduce the read video data.

* * * * *

UNITED STATES PATENT AND TRADEMARK OFFICE
CERTIFICATE OF CORRECTION

PATENT NO.    : 6,445,877 B1                                                           Page 1 of 1
DATED         : September 3, 2002
INVENTOR(S)   : Tomoyuki Okada et al.

It is certified that error appears in the above-identified patent and that said Letters Patent is hereby corrected as shown below:

Column 27,
Line 63, replace "pictures each picture" with -- pictures, each picture --.
Line 64, replace "inter-picture encoding" with -- intra-picture encoding --.
Line 67, replace "block, having" with -- block having --.

Signed and Sealed this

Fourth Day of February, 2003

JAMES E. ROGAN
*Director of the United States Patent and Trademark Office*